US010157319B2

(12) United States Patent
Xiao et al.

(10) Patent No.: US 10,157,319 B2
(45) Date of Patent: Dec. 18, 2018

(54) MONITORING, DETECTION, AND SURVEILLANCE SYSTEM USING PRINCIPAL COMPONENT ANALYSIS WITH MACHINE AND SENSOR DATA

(71) Applicant: SAS Institute Inc., Cary, NC (US)

(72) Inventors: Wei Xiao, Seattle, WA (US); Jorge Manuel Gomes da Silva, Durham, NC (US); Saba Emrani, Santa Clara, CA (US); Arin Chaudhuri, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/894,002

(22) Filed: Feb. 12, 2018

(65) Prior Publication Data

US 2018/0239740 A1 Aug. 23, 2018

Related U.S. Application Data

(60) Provisional application No. 62/462,291, filed on Feb. 22, 2017.

(51) Int. Cl.
*G06K 9/62* (2006.01)
*G06K 9/00* (2006.01)
(Continued)

(52) U.S. Cl.
CPC ......... *G06K 9/00771* (2013.01); *G06F 17/16* (2013.01); *G06F 17/18* (2013.01);
(Continued)

(58) Field of Classification Search
CPC .......................... G06K 9/6247; G06K 9/6232
See application file for complete search history.

(56) References Cited

U.S. PATENT DOCUMENTS 7,590,282 B2  9/2009  Fan et al.
9,598,947 B2 *  3/2017  Wang ...................... E21B 44/00
(Continued)

OTHER PUBLICATIONS

Candes et al., Robust Principal Component Analysis?, arXiv:0912.3599v1, Dec. 18, 2009.
(Continued)

*Primary Examiner* — Samuel G Neway
(74) *Attorney, Agent, or Firm* — Bell & Manning, LLC

(57) ABSTRACT

A computing device detects an abnormal observation vector using a principal components decomposition. The principal components decomposition includes a sparse noise vector $s_t$ computed for the observation vector that includes a plurality of values, wherein each value is associated with a variable to define a plurality of variables. The sparse noise vector $s_t$ has a dimension equal to m a number of the plurality of variables. A zero counter time series value $\hat{c}_t$ is computed using $\hat{c}_t = \Sigma_{i=1}^{m} s_t[i]$. A probability value for $\hat{c}_t$ is computed using $p = \Sigma_{i=\hat{c}_t+1}^{m+1} H_c[i] / \Sigma_{i=0}^{m+1} H_c[i]$, where $H_c[i]$ includes a count of a number of times each value of $\hat{c}_t$ occurred for previous observation vectors. The probability value is compared with a predefined abnormal observation probability value. An abnormal observation indicator is set when the probability value indicates the observation vector is abnormal. The observation vector is output when the probability value indicates the observation vector is abnormal.

30 Claims, 23 Drawing Sheets

(51) Int. Cl.
G06K 9/48 (2006.01)
G06F 17/16 (2006.01)
G06F 17/18 (2006.01)
G06F 9/30 (2018.01)

(52) U.S. Cl.
CPC .............. *G06K 9/481* (2013.01); *G06K 9/623* (2013.01); *G06K 9/6232* (2013.01); *G06K 9/6247* (2013.01); *G06F 9/30036* (2013.01)

(56) References Cited

U.S. PATENT DOCUMENTS

| | | | |
|---|---|---|---|
| 9,697,177 | B1 | 7/2017 | Cairns |
| 2008/0059051 | A1* | 3/2008 | Kumagai ............. G08G 1/0104 701/117 |
| 2009/0310855 | A1 | 12/2009 | Gennari et al. |
| 2011/0272161 | A1* | 11/2011 | Kumaran ............... G01V 1/301 166/369 |
| 2012/0063641 | A1 | 3/2012 | Venkatesh et al. |
| 2015/0323425 | A1* | 11/2015 | Bang .................. G05B 23/0283 702/183 |

OTHER PUBLICATIONS

Lin et al., The Augmented Lagrange Multiplier Method for Exact Recovery of Corrupted Low-Rank Matrices, arXiv:1009.5055v3, Oct. 18, 2013.
Feng et al., Online Robust PCA via Stochastic Optimization, Neural Information Processing Systems, Jan. 1, 2013.
SAS Institute Inc. 2017. SAS® Visual Data Mining and Machine Learning 8.1: Data Mining and Machine Learning Procedures. Cary, NC: SAS Institute Inc., Mar. 2017.
Lin et al., Fast Convex Optimization Algorithms for Exact Recovery of a Corrupted Low-Rank Matrix, 2009.
De La Torre et al., A Framework for Robust Subspace Learning, International Journal of Computer Vision 54, 2003, pp. 117-142.
Zhang et al., A Novel M-Estimator for Robust PCA, Journal of Machine Learning Research 15, Feb. 2014, pp. 749-808.
Aravkin et al., A variational approach to stable principal component pursuit, arXiv:1406.1089v1, Jun. 4, 2014.
Guo et al., An Online Algorithm for Separating Sparse and Low-dimensional Signal Sequences from their Sum, arXiv:1310.4261v3, Jun. 19, 2014.
S. Roweis, EM Algorithms for PCA and SPCA, Neural Information Processing Systems, 1997.
Candes et al., Exact Matrix Completion via Convex Optimization, Apr. 3, 2009.
Recht et al., Guaranteed Minimum-Rank Solutions of Linear Matrix Equations via Nuclear Norm Minimization, Jul. 19, 2007.
Qiu et al., Recursive Robust PCA or Recursive Sparse Recovery in Large but Structured Noise, arXiv:1211.3754v10, Aug. 19, 2014.
Bouwmans et al., Robust PcCA via Principal Component Pursuit: A Review for a Comparative Evaluation in Video Surveillance, Dec. 19, 2013.
Wright et al., Robust Principal Component Analysis: Exact Recovery of Corrupted Low-Rank Matrices by Convex Optimization, Jan. 2009.
Zhou et al., Stable Principal Component Pursuit, Jan. 2010.
Lin et al., The Augmented Lagrange Multiplier Method for Exact Recovery of Corrupted Low-Rank Matrices, 2009.
McCoy et al., Two proposals for robust PCA using semidefinite programming, Electronic Journal of Statistics, vol. 5, 2011, pp. 1123-1160.
Krim et al., Two Decades of Array Signal Processing Research, IEEE Signal Processing Magazine, Jul. 1996, pp. 67-94.
He et al., Incremental Gradient on the Grassmannian for Online Foreground and Background Separation in Subsampled Video, Computer Vision and Pattern Recognition, 2012.
Basri et al., Lambertian Reflectance and Linear Subspaces, IEEE Transactions on Pattern Analysis and Machine Intelligence, vol. 25, No. 2, Feb. 2003, pp. 218-233.
Jiang et al., Online Data Thinning via Multi-Subspace Tracking, arXiv:1609.03544v1, Sep. 12, 2016.
Balzano et al., Online Identification and Tracking of Subspaces from Highly Incomplete Information, , Jun. 20, 2010.
He et al., Online Robust Subspace Tracking from Partial Information, arXiv:1109.3827v2, Sep. 17, 2011.

* cited by examiner

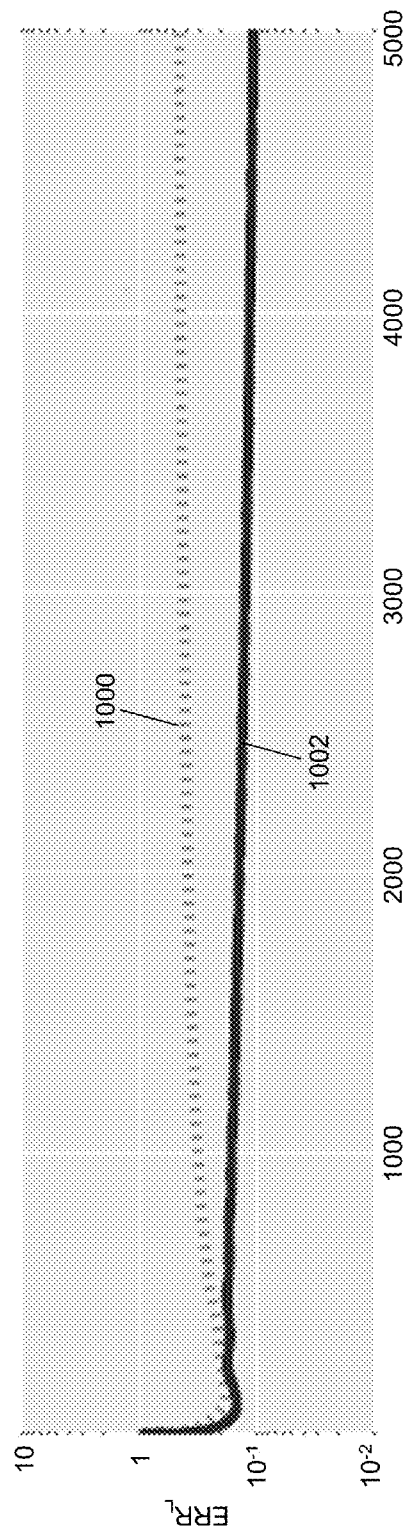
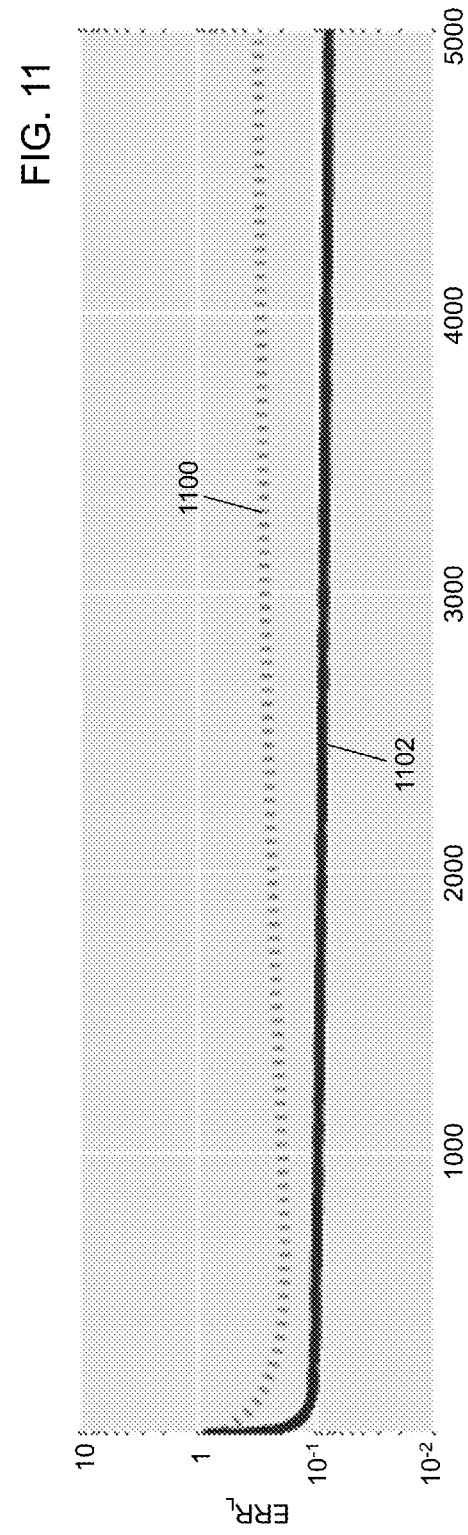
FIG. 10
FIG. 11

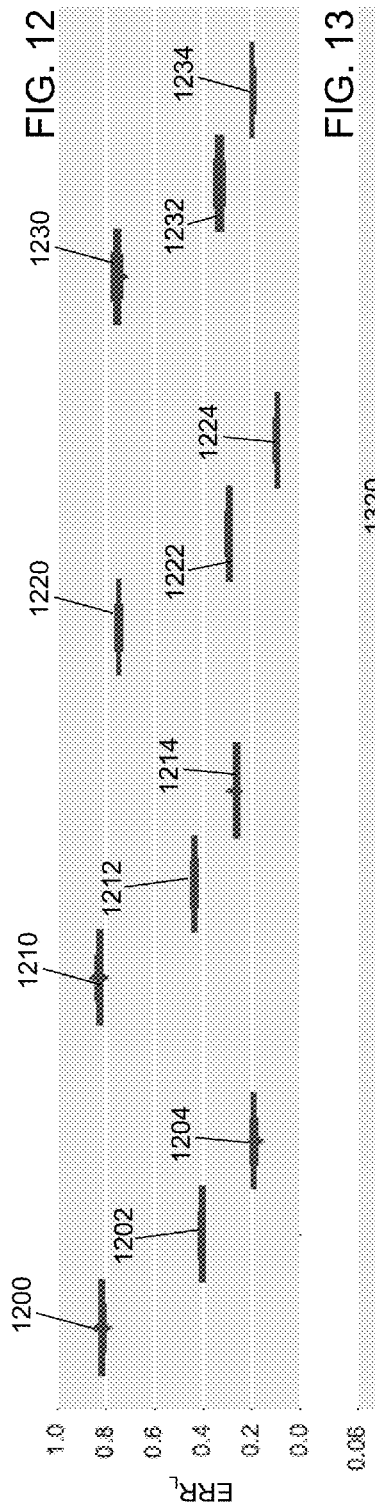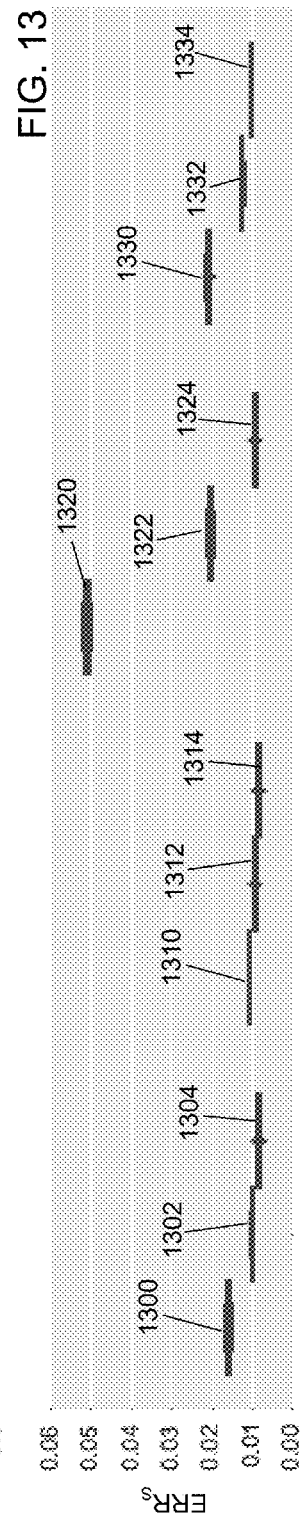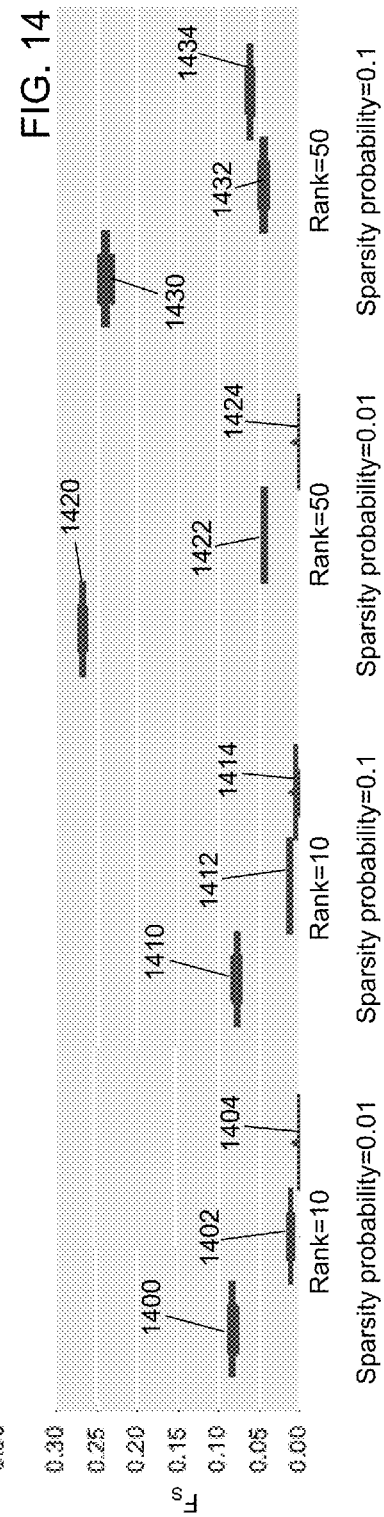

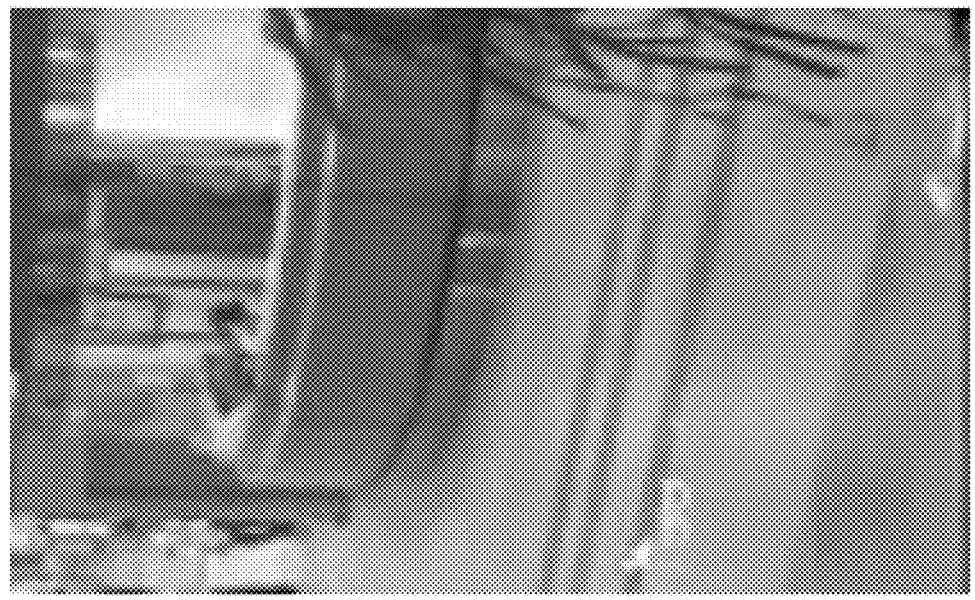

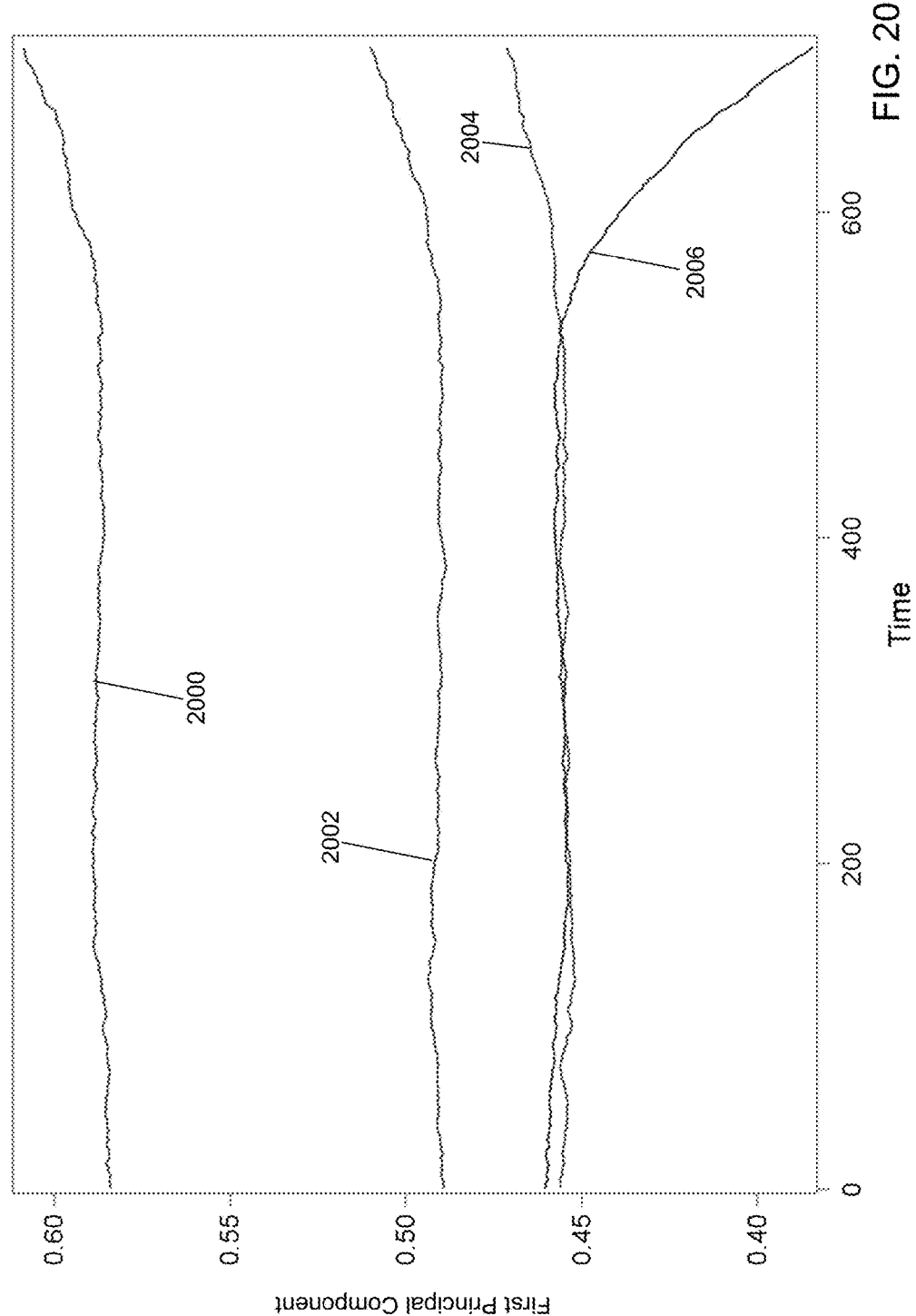

MONITORING, DETECTION, AND SURVEILLANCE SYSTEM USING PRINCIPAL COMPONENT ANALYSIS WITH MACHINE AND SENSOR DATA

CROSS-REFERENCE TO RELATED APPLICATIONS

The present application claims the benefit of 35 U.S.C. § 119(e) to U.S. Provisional Patent Application No. 62/462,291 filed on Feb. 22, 2017, the entire contents of which is hereby incorporated by reference.

BACKGROUND

Low-rank subspace models are powerful tools to analyze high-dimensional data from dynamical systems. Applications include tracking in radar and sonar, face recognition, recommender systems, cloud removal in satellite images, anomaly detection, background subtraction for surveillance video, system monitoring, etc. Principal component analysis (PCA) is a widely used tool to obtain a low-rank subspace from high dimensional data. For a given rank r, PCA finds the r-dimensional linear subspace that minimizes the square error loss between a data vector and its projection onto that subspace. Although PCA is widely used, it is not robust against outliers. With just one grossly corrupted entry, the low-rank subspace estimated from classic PCA can be arbitrarily far from the true subspace. This shortcoming reduces the value of PCA because outliers are often observed in the modern world's massive data. For example, data collected through sensors, cameras, websites, etc. are often very noisy and contain error entries or outliers.

Robust PCA (RPCA) methods have been investigated to provide good practical performance with strong theoretical performance guarantees, but are typically batch algorithms that require loading of all observations into memory before processing. This makes them inefficient and impractical for use in processing very large datasets commonly referred to as "big data" due to the amount of memory required and the slow processing speeds. The robust PCA methods further fail to address the problem of slowly or abruptly changing subspace.

SUMMARY

In an example embodiment, a non-transitory computer-readable medium is provided having stored thereon computer-readable instructions that, when executed by a computing device, cause the computing device to detect an abnormal observation vector using a principal components decomposition. A principal components decomposition is computed using an observation vector. The principal components decomposition includes a sparse noise vector $s_t$ computed for the observation vector. The observation vector includes a plurality of values, wherein each value of the plurality of values is associated with a variable to define a plurality of variables. Each variable of the plurality of variables describes a characteristic of a physical object. The sparse noise vector $s_t$ has a dimension equal to m a number of the plurality of variables. A zero counter time series value $\hat{c}_t$ is computed using $\hat{c}_t = \sum_{i=1}^{m} s_t[i]$. A probability value for $\hat{c}_t$ is computed using $p = \sum_{i=\hat{c}_t+1}^{m+1} H_c[i] / \sum_{i=0}^{m+1} H_c[i]$, where $H_c[i]$ includes a count of a number of times each value of $\hat{c}_t$ occurred for a plurality of previous observation vectors. The computed probability value is compared with a predefined abnormal observation probability value. An abnormal observation indicator is set when the computed probability value indicates the observation vector is abnormal. The observation vector is output when the computed probability value indicates the observation vector is abnormal.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to detect an abnormal observation vector using a principal components decomposition.

In yet another example embodiment, a method of detecting an abnormal observation vector using a principal components decomposition is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 10 provides a comparison as a function of time between the relative error computed for the low-rank matrix using the known RPCA algorithm, using the operations of FIGS. 2-4, and using the operations of FIGS. 3-5 with a rank of 10, a sparsity probability of 0.01, and the slowly changing subspace in accordance with an illustrative embodiment.

FIG. 11 provides a comparison as a function of time between the relative error computed for the low-rank matrix using the known RPCA algorithm, using the operations of FIGS. 2-4, and using the operations of FIGS. 3-5 with a rank of 50, a sparsity probability of 0.01, and the slowly changing subspace in accordance with an illustrative embodiment.

FIG. 12 provides a comparison between a relative error computed for the low-rank matrix using the known RPCA algorithm, using the operations of FIGS. 2-4, and using the operations of FIGS. 3-5 with two abrupt changes in the subspace in accordance with an illustrative embodiment.

FIG. 13 provides a comparison between a relative error computed for the sparse noise matrix using the known RPCA algorithm, using the operations of FIGS. 2-4, and using the operations of FIGS. 3-5 with the two abrupt changes in the subspace in accordance with an illustrative embodiment.

FIG. 14 provides a comparison between the proportion of correctly identified elements in the sparse noise matrix using the known RPCA algorithm, using the operations of FIGS. 2-4, and using the operations of FIGS. 3-5 with the two abrupt changes in the subspace in accordance with an illustrative embodiment.

FIG. 18A shows an image capture from an airport video at a first time in accordance with an illustrative embodiment.

FIG. 20 shows a comparison of principal components computed using moving windows RPCA in accordance with an illustrative embodiment.

DETAILED DESCRIPTION

Figure 1:
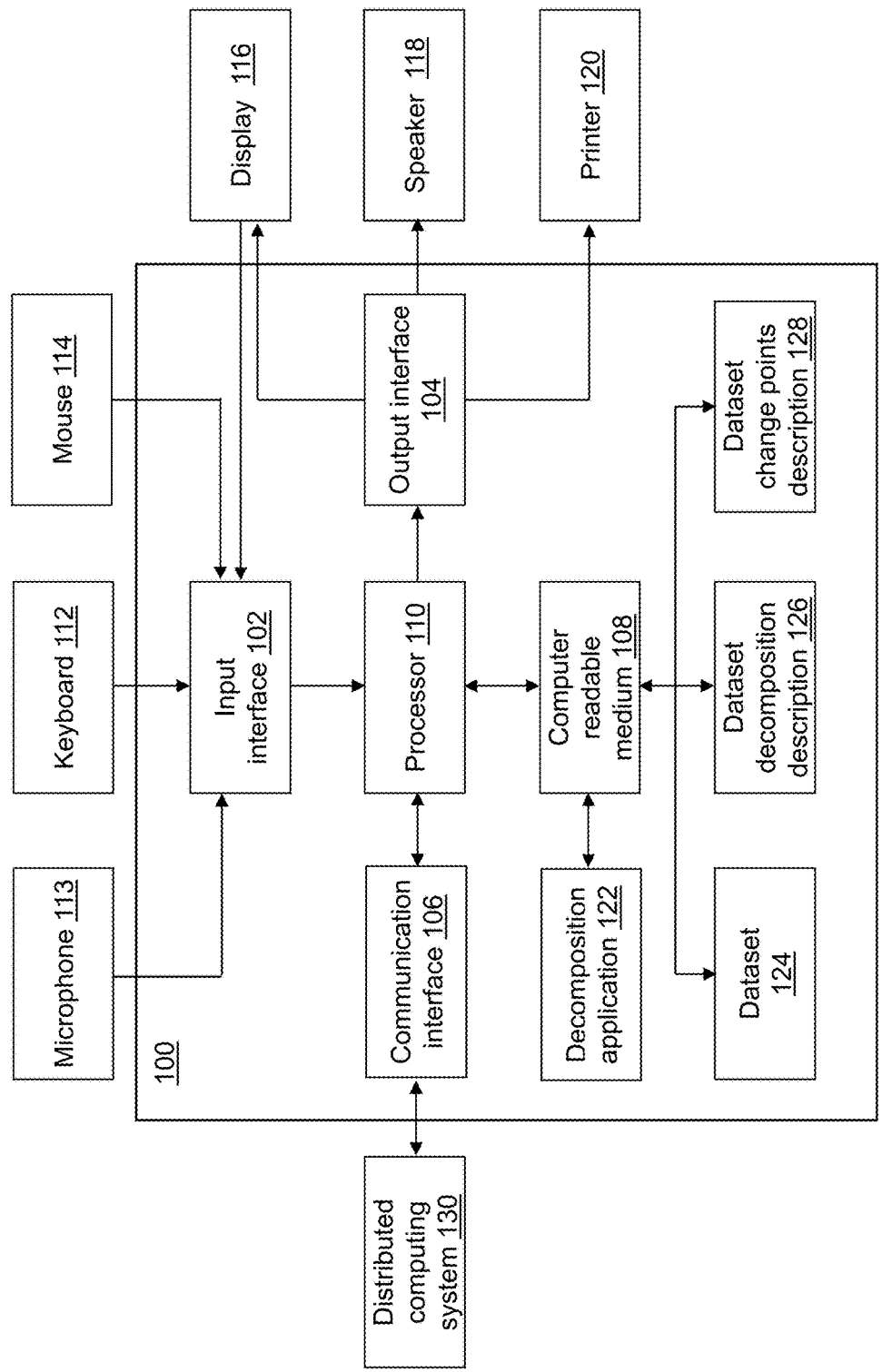
FIG. 1 depicts a block diagram of a monitoring device in accordance with an illustrative embodiment.

Referring to FIG. 1, a block diagram of a monitoring device 100 is shown in accordance with an illustrative embodiment. Monitoring device 100 may include an input interface 102, an output interface 104, a communication interface 106, a non-transitory computer-readable medium 108, a processor 110, a decomposition application 122, a dataset 124, a dataset decomposition description 126, and a dataset change points description 128. Fewer, different, and/or additional components may be incorporated into monitoring device 100.

Input interface 102 provides an interface for receiving information from the user or another device for entry into monitoring device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into monitoring device 100 or to make selections presented in a user interface displayed on display 116. The same interface may support both input interface 102 and output interface 104. For example, display 116 comprising a touch screen provides a mechanism for user input and for presentation of output to the user. Monitoring device 100 may have one or more input interfaces that use the same or a different input interface technology. The input interface technology further may be accessible by monitoring device 100 through communication interface 106.

Output interface 104 provides an interface for outputting information for review by a user of monitoring device 100 and/or for use by another application or device. For example, output interface 104 may interface with various output technologies including, but not limited to, display 116, a speaker 118, a printer 120, etc. Monitoring device 100 may have one or more output interfaces that use the same or a different output interface technology. The output interface technology further may be accessible by monitoring device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Monitoring device 100 may have one or more communication interfaces that use the same or a different communication interface technology. For example, monitoring device 100 may support communication using an Ethernet port, a Bluetooth antenna, a telephone jack, a USB port, etc. Data and messages may be transferred between monitoring device 100 and another computing device of a distributed computing system 130 using communication interface 106.

Computer-readable medium 108 is a non-transitory electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Monitoring device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Monitoring device 100 also may have one or more drives that support the loading of a memory media such as a CD, DVD, an external hard drive, etc. One or more external hard drives further may be connected to monitoring device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Monitoring device 100 may include a plurality of processors that use the same or a different processing technology.

Decomposition application 122 performs operations associated with defining dataset decomposition 126 and/or dataset change points description 128 from data stored in dataset 124. Dataset decomposition 126 may be used to monitor changes in data in dataset 124 to support various data analysis functions as well as provide alert/messaging related to the monitored data. Some or all of the operations described herein may be embodied in decomposition application 122. The operations may be implemented using hardware, firmware, software, or any combination of these methods.

Referring to the example embodiment of FIG. 1, decomposition application 122 is implemented in software (comprised of computer-readable and/or computer-executable instructions) stored in computer-readable medium 108 and accessible by processor 110 for execution of the instructions that embody the operations of decomposition application 122. Decomposition application 122 may be written using one or more programming languages, assembly languages, scripting languages, etc. Decomposition application 122 may be integrated with other analytic tools. As an example, decomposition application 122 may be part of an integrated data analytics software application and/or software architecture such as that offered by SAS Institute Inc. of Cary, N.C., USA. For example, decomposition application 122 may be part of SAS® Enterprise Miner™ or of SAS® Viya™ or of SAS® Visual Data Mining and Machine Learning, all of which are developed and provided by SAS Institute Inc. of Cary, N.C., USA and may be used to create highly accurate predictive and descriptive models based on analysis of vast amounts of data from across an enterprise. Merely for further illustration, decomposition application 122 may be implemented using or integrated with one or more SAS software tools such as Base SAS, SAS/STAT®, SAS® High Performance Analytics Server, SAS® LASR™, SAS® In-Database Products, SAS® Scalable Performance Data Engine, SAS/ORO, SAS/ETSO, SAS® Event Stream Processing, SAS® Inventory Optimization, SAS® Inventory Optimization Workbench, SAS® Visual Analytics, SAS In-Memory Statistics for Hadoop®, SAS® Forecast Server, all of which are developed and provided by SAS Institute Inc. of Cary, N.C., USA. Data mining is applicable in a wide variety of industries.

Decomposition application 122 may be integrated with other system processing tools to automatically process data generated as part of operation of an enterprise, device, system, facility, etc., to identify any outliers in the processed data, to monitor changes in the data, to track movement of an object, to process an image, a video, a sound file or other data files such as for background subtraction, cloud removal, face recognition, etc., and to provide a warning or alert associated with the monitored data using input interface 102, output interface 104, and/or communication interface 106 so that appropriate action can be initiated in response to changes in the monitored data.

Decomposition application 122 may be implemented as a Web application. For example, decomposition application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Dataset 124 may include, for example, a plurality of rows and a plurality of columns. The plurality of rows may be referred to as observation vectors or records (observations), and the columns may be referred to as variables. Dataset 124 may be transposed. Dataset 124 may include unsupervised data. The plurality of variables may define multiple dimensions for each observation vector. An observation vector $m_i$ may include a value for each of the plurality of variables associated with the observation i. For example, if dataset 124 includes data related to operation of a vehicle, the variables may include an oil pressure, a speed, a gear indicator, a gas tank level, a tire pressure for each tire, an engine temperature, a radiator level, etc. Dataset 124 may include data captured as a function of time for one or more physical objects.

The data stored in dataset 124 may be generated by and/or captured from a variety of sources including one or more sensors of the same or different type, one or more computing devices, etc. The data stored in dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA. As a result, the data of dataset 124 may be processed as it is streamed through monitoring device 100.

As used herein, the data may include any type of content represented in any computer-readable format such as binary, alphanumeric, numeric, string, markup language, etc. The data may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that may be organized as a table of observations (rows) and variables (columns) that can be processed by one or more SAS software tools.

Dataset 124 may be stored on computer-readable medium 108 or on one or more computer-readable media of distributed computing system 130 and accessed by monitoring device 100 using communication interface 106, input interface 102, and/or output interface 104. Data stored in dataset 124 may be sensor measurements or signal values captured by a sensor, may be generated or captured in response to occurrence of an event or a transaction, generated by a device such as in response to an interaction by a user with the device, etc. The data stored in dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in dataset 124 may be captured at different time points periodically, intermittently, when an event occurs, etc. One or more columns of dataset 124 may include a time and/or date value.

Dataset 124 may include data captured under normal operating conditions of the physical object. Dataset 124 may include data captured at a high data rate such as 200 or more observations per second for one or more physical objects. For example, data stored in dataset 124 may be generated as part of the Internet of Things (IoT), where things (e.g., machines, devices, phones, sensors) can be connected to networks and the data from these things collected and processed within the things and/or external to the things before being stored in dataset 124. For example, the IoT can include sensors in many different devices and types of devices, and high value analytics can be applied to identify hidden relationships, monitor for system changes, etc. to drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in dataset 124.

Dataset 124 may be stored using various structures as known to those skilled in the art including one or more files of a file system, a relational database, one or more tables of a system of tables, a structured query language database, etc. on monitoring device 100 or on distributed computing system 130. Monitoring device 100 may coordinate access to dataset 124 that is distributed across distributed computing system 130 that may include one or more computing devices. For example, dataset 124 may be stored in a cube distributed across a grid of computers as understood by a person of skill in the art. As another example, dataset 124 may be stored in a multi-node Hadoop® cluster. For instance, Apache™ Hadoop® is an open-source software framework for distributed computing supported by the Apache Software Foundation. As another example, dataset 124 may be stored in a cloud of computers and accessed using cloud computing technologies, as understood by a person of skill in the art. The SAS® LASR™ Analytic Server may be used as an analytic platform to enable multiple users to concurrently access data stored in dataset 124. The SAS® Viya™ open, cloud-ready, in-memory architecture also may be used as an analytic platform to enable multiple users to concurrently access data stored in dataset 124. Some systems may use SAS In-Memory Statistics for Hadoop® to read big data once and analyze it several times by persisting it in-memory for the entire session. Some systems may be of other types and configurations.

Bold letters are used herein to denote vectors and matrices. $\|a\|_1$, and $\|a\|_2$ represent the l1-norm and l2-norm of vector a, respectively. For an arbitrary real matrix A, $\|A\|_F$ denotes a Frobenius norm of matrix A, $\|A\|_*$ denotes a nuclear norm of matrix A (sum of all singular values), and $\|A\|_1$ denotes the l1-norm of matrix A, where A is treated as a vector.

An objective function for robust principal component analysis (RPCA) may decompose an observed matrix M (such as data in dataset 124) into a low-rank matrix L and a sparse noise matrix S by solving a principal component pursuit (PCP):

$$\min_{L,S} \|L\|_* + \lambda \|S\|_1, \quad (1)$$

subject to $$L + S = M. \quad (2)$$

Figure 6:
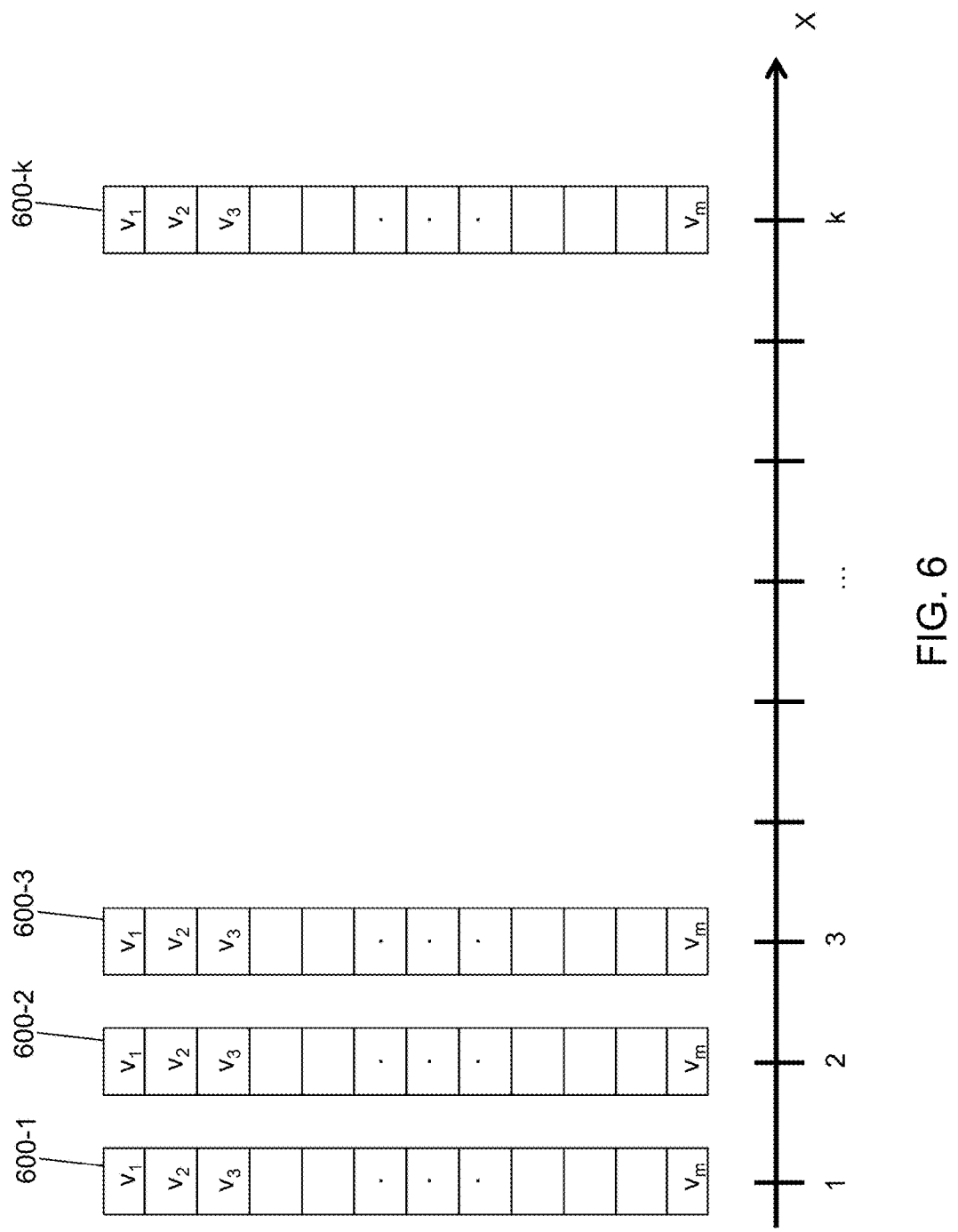
FIG. 6 graphically illustrates a plurality of observation vectors in accordance with an illustrative embodiment.

As used herein, T denotes a number of observations in dataset 124, and t is an index to a specific observation vector in dataset 124. $m_t$ is an observation vector of dimension m as in $m_t$ is represented by m variables of the plurality of variables in dataset 124. Data referenced as dataset 124 may be streaming observations $m_t \in \mathbb{R}^m$, $t=1, \ldots, T$, which can be decomposed into two parts as $m_t = l_t + s_t$. The first part $l_t$ is a vector from a low-rank subspace $U_t$, and the second part $s_t$ is a sparse error with support size $c_t$, where $c_t$ represents a number of nonzero elements of $s_t$, such that $c_t = \Sigma_{i=1}^m I_{s_t[i] \neq 0}$. The underlying subspace $U_t$ may or may not change with time t. When $U_t$ does not change over time, the data in dataset 124 are generated from a stable subspace. Otherwise, the data in dataset 124 are generated from a changing subspace that may be slowly changing, quickly changing, and/or abruptly changing. $s_t$ may satisfy a sparsity assumption, i.e., $c_t \ll m$ for all $t=1, \ldots, T$. $M_t = [m_1, \ldots, m_t] \in \mathbb{R}^{m \times t}$ denotes a matrix of observation vectors until time t, and M, L, S denote $M_t$, $L_t$, $S_t$, respectively. For illustration, FIG. 6 shows a plurality of observation vectors such as a first observation vector $m_1$ 600-1, a second observation vector $m_2$ 600-2, a third observation vector $m_3$ 600-3, ..., and a $k^{th}$ observation vector $m_k$ 600-k, where each observation vector includes $m=[v_1, v_2, v_3, \ldots, v_m]$, where $v_1$ is a value for a first variable of the plurality of variables, $v_2$ is a value for a second variable of the plurality of variables, $v_3$ is a value for a third variable of the plurality of variables, ..., $v_m$ is a value for an $m^{th}$ variable of the plurality of variables.

As understood by a person of skill in the art, various algorithms have been developed to solve RPCA-PCP, including accelerated proximal gradient (APG) (see e.g., Z. Lin, A. Ganesh, J. Wright, L. Wu, M. Chen, and Y. Ma, "Fast convex optimization algorithms for exact recovery of a corrupted low-rank matrix," *Computational Advances in Multi-Sensor Adaptive Processing (CAMSAP)*, vol. 61, 2009.) and augmented Lagrangian multiplier (ALM) (see e.g., Z. Lin, M. Chen, and Y. Ma, "The augmented Lagrange multiplier method for exact recovery of corrupted low-rank matrices," arXiv preprint arXiv:1009.5055, 2010.).

Merely for illustration, in implementing RPCA-PCP-ALM, let $S_\tau$ denote a shrinkage operator $S_\tau=\text{sgn}(x)\max(|x|-\tau, 0)$, which is extended to matrices by applying it to each matrix element. Let $\mathcal{D}_\tau(X)$ denote a singular value thresholding operator given by $\mathcal{D}_\tau(X)=US_\tau(\Sigma)V^*$, where $X=U\Sigma V^*$ is any singular value decomposition. Matrices $S_0$ and $Y_0$ may be initialized to zero and a loop of equations (1) to (3) below repeated until a convergence criteria (e.g., number of iterations tolerance value) specified by a user is satisfied:

$$L^{(k+1)}=\mathcal{D}_{\mu^{-1}}(M-S^{(k)}+\mu^{-1}Y^{(k)}) \quad (1)$$

$$S^{(k+1)}=\mathcal{S}_{\lambda\mu^{-1}}(M-L^{(k+1)}+\mu^{-1}Y^{(k)}) \quad (2)$$

$$Y^{(k+1)}=Y^{(k)}+\mu(M-L^{(k+1)}+S^{(k+1)}) \quad (3)$$

$\mathcal{D}_{\mu^{-1}}$ is computed by choosing values for constants $\mu$ and $\lambda$. A singular value decomposition (SVD) is computed of X to determine U, $\Sigma$, and V. $S_\tau$ is applied to $\Sigma$ with $\tau=\mu^{-1}$ to shrink the computed singular values. The singular values smaller than $\mu^{-1}$ are set to zero while U and V* are not modified. $\mathcal{S}_{\lambda\mu^{-1}}$ is computed using equation (2) by applying $S_\tau$ with $\tau=\lambda\mu^{-1}$ to shrink a residual of the decomposition. The process is repeated until convergence, where an upper indice (e.g., (k), (k+1)) denote an iteration number for the same observation $m_t$.

As another illustration, a stochastic optimization RPCA-PCP (STOC-RPCA-PCP) is described by J. Feng, H. Xu, and S. Yan, "Online robust pca via stochastic optimization," in *Advances in Neural Information Processing Systems* 26 (C. J. C. Burges, L. Bottou, M. Welling, Z. Ghahramani, and K. Q. Weinberger, eds.), pp. 404-412, Curran Associates, Inc., 2013. STOC-RPCA-PCP starts by minimizing a loss function below:

$$\min_{L,S} \frac{1}{2}\|M-L-S\|_F^2 + \lambda_1\|L\|_* + \lambda_2\|S\|_1, \quad (4)$$

where $\lambda_1$, $\lambda_2$ are tuning parameters defined by a user as understood by a person of skill in the art. An equivalent form of the nuclear norm can be defined by the following, which states that the nuclear norm for a matrix L whose rank is upper bounded by r has an equivalent form:

$$\|L\|_* = \inf_{U\in\mathbb{R}^{m\times r},V\in\mathbb{R}^{n\times r}} \left\{\frac{1}{2}\|U\|_F^2 + \frac{1}{2}\|V\|_F^2 : L=UV\right\}. \quad (5)$$

Substituting L with UV and plugging equation (5) into equation (4) results in $$\min_{U\in\mathbb{R}^{m\times r},V\in\mathbb{R}^{n\times r}} \frac{1}{2}\|M-UV-S\|_F^2 + \frac{\lambda_1}{2}(\|U\|_F^2+\|V\|_F^2)+\lambda_2\|S\|_1 \quad (6)$$

where U can be seen as a basis for the low-rank subspace and V represents coefficients of the observations with respect to the basis. STOC-RPCA-PCP minimizes an empirical version of the loss function of equation (6) and processes one observation vector each time instance. Though t is indicated as a time point other types of monotonically increasing values, preferably with a common difference between successive values, may be used. Given a finite set of observation vectors $M_t=[m_1, \ldots, m_t]\in\mathbb{R}^{m\times t}$, the empirical version of the loss function of equation (6) at time point t can be defined by $$f_t(U) = \frac{1}{t}\sum_{i=1}^{t}\ell(m_i, U) + \frac{\lambda_1}{2t}\|U\|_F^2,$$

where the loss function for each observation is defined as $$\ell(m_i, U) \triangleq \min_{v,s} \frac{1}{2}\|m_i-Uv-s\|_2^2 + \frac{\lambda_1}{2}\|v\|_2^2 + \lambda_2\|s\|_1.$$

Fixing U as $U_t$, $v_t$ and $s_t$ can be obtained by solving the optimization problem:

$$(v_t, s_t) = \arg\min_{v,s} \frac{1}{2}\|m_t-Uv-s\|_2^2 + \frac{\lambda_1}{2}\|v\|_2^2 + \lambda_2\|s\|_1.$$

Figure 2:
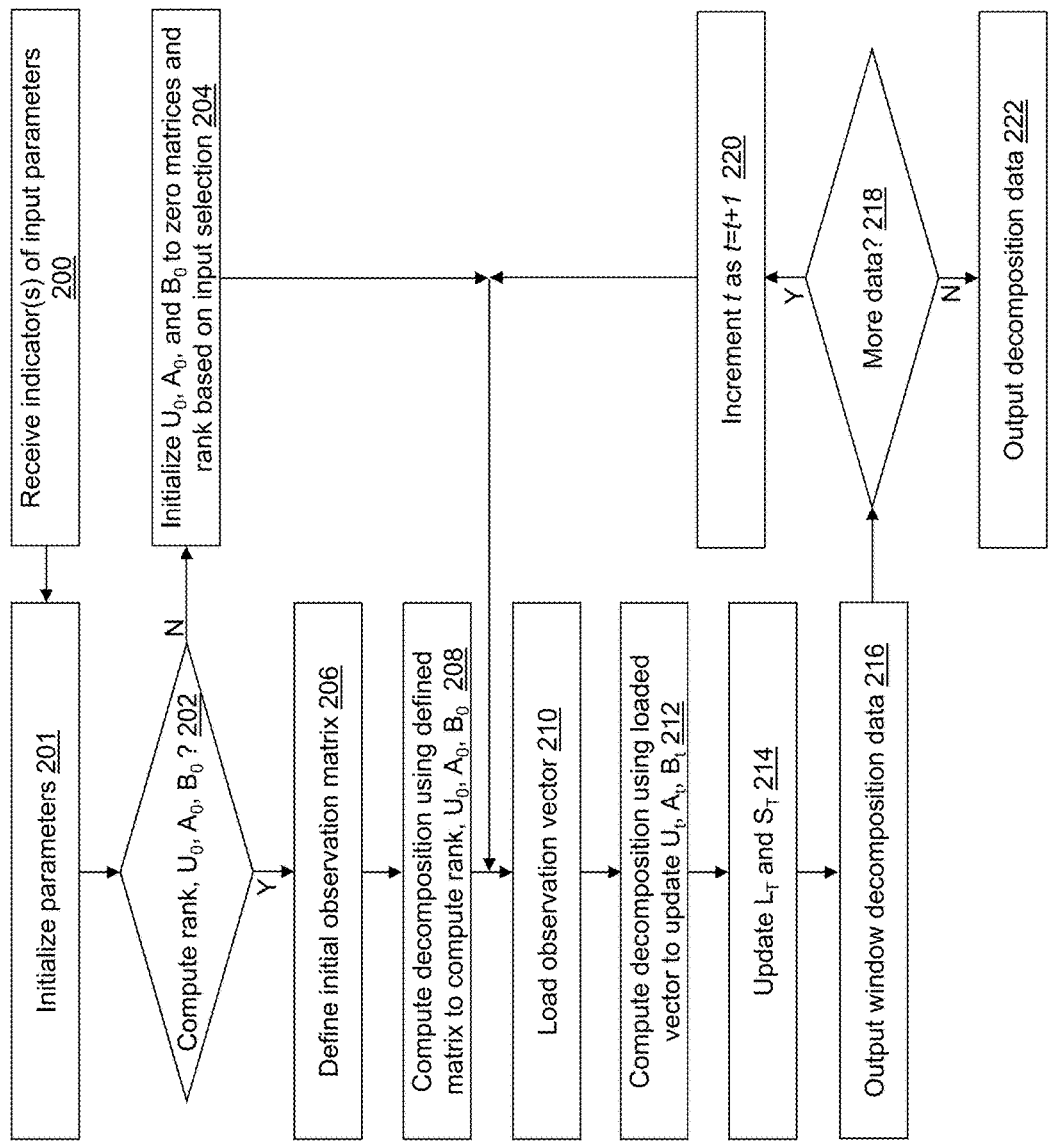
FIG. 2 depicts a flow diagram illustrating example operations performed by the monitoring device of FIG. 1 in accordance with an illustrative embodiment.

Assuming that $\{v_i,s_i\}_{i=1}^t$ are known, the basis $U_t$ can be updated by minimizing the following function:

$$g_t(U) \triangleq \frac{1}{t}\sum_{i=1}^{t}\left(\frac{1}{2}\|m_i-Uv_i\|_2^2 + \frac{\lambda_1}{2}\|v_i\|_2^2+\lambda_2\|s_i\|_1\right) + \frac{\lambda_1}{2t}\|U\|_F^2,$$

which results in the explicit solution $$U_t = \left[\sum_{i=1}^{t}(m_i-s_i)v_i^T\right]\left[\left(\sum_{i=1}^{t}v_iv_i^T\right)+\lambda_1 I\right]^{-1}$$

where $v_i^T$ represents the transpose of $v_i$ and I represents an identity matrix. Referring to FIG. 2, example operations associated with decomposition application 122 are described. Decomposition application 122 may implement an algorithm referenced herein as online, moving window, RPCA-PCP (OMWRPCA). Additional, fewer, or different operations may be performed depending on the embodiment of decomposition application 122. The order of presentation of the operations of FIG. 2 is not intended to be limiting. Although some of the operational flows are presented in sequence, the various operations may be performed in various repetitions, concurrently (in parallel, for example, using threads and/or distributed computing system 130), and/or in other orders than those that are illustrated. A user may execute decomposition application 122, which causes presentation of a first user interface window, which may include a plurality of menus and selectors such as drop down menus, buttons, text boxes, hyperlinks, etc. associated with decomposition application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by decomposition application 122.

In an operation 200, one or more indicators may be received that indicate values for input parameters used to define execution of decomposition application 122. As an example, the one or more indicators may be received by decomposition application 122 after selection from a user interface window, after entry by a user into a user interface window, read from a command line, read from a memory location of computer-readable medium 108 or of distributed computing system 130, etc. In an alternative embodiment, one or more input parameters described herein may not be user selectable. For example, a value may be used or a function may be implemented automatically or by default. Illustrative input parameters may include, but are not limited to:

- an indicator of dataset 124, such as a location and a name of dataset 124;
- an indicator of a plurality of variables of dataset 124 to define m, such as a list of column names that include numeric values;
- an indicator of a value of T, a number of observations to process that may be an input or determined by reading dataset 124 or may be determined by incrementing a counter for each streaming observation processed;
- an indicator of one or more rules associated with selection of an observation from the plurality of observations of dataset 124 where a column may be specified with a regular expression to define the rule;
- an indicator of a value of $n_{win}$, a window size for a number of observations (in general, the value of $n_{win}$ should be long enough to capture a temporal content of the signal, but short enough that the signal is approximately stationary within the window; thus, the value is related to how fast the underlying subspace is changing such that, for an underlying subspace that changes quickly, a small value is used; for illustration a default value may be 200);
- an indicator of a value of $n_{start}$, a number of observations used to initialize the OMWRPCA algorithm where a default value may be $n_{start}=n_{win}$ ($n_{start}$ may not be equal to $n_{win}$, for example, when initialization may include more observations for accuracy);
- an indicator of a value of rank r of the r-dimensional linear subspace that is not used if the $n_{start}$ observations are used initialize the OMWRPCA algorithm (in general, the value of r may be selected to be large enough to capture "most" of the variance of the data, where "most" may be defined, for example, as 90%, or a maximum allowed value based on a dimensionality of the observations);
- an indicator of whether to use the $n_{start}$ observations to initialize the OMWRPCA algorithm and to define the rank r or to use zero matrices and the indicated rank r (values of rank r and/or $n_{start}$ may indicate that one or the other is used as well. For example, rank r equal to zero may indicate that the $n_{start}$ observations are used to initialize the OMWRPCA algorithm without a separate input parameter);
- an indicator of a value of λ, a first tuning parameter defined above (in general, the value of λ may be set to either of the values of $\lambda_1$ or $\lambda_2$ though other values may be used, for example, as described in E. J. Candès, X. Li, Y. Ma, and J. Wright, "Robust principal component analysis?", *Journal of the ACM (JACM)*, vol. 58, no. 3, p. 11, 2011);
- an indicator of a value of μ, a second tuning parameter defined above (in general, the value of μ may be selected based on a desired level of accuracy. For illustration, $$\mu = \frac{mn_{win}}{\sum_{i=1}^{m}\sum_{j=1}^{n_{win}}|M_{ij}|};$$

- an indicator of a value of $\lambda_1$, a third tuning parameter defined above where a default value may be $\lambda_1=1/\sqrt{\max(m,n_{win})}$;
- an indicator of a value of $\lambda_2$, a fourth tuning parameter defined above where a default value may be $\lambda_2=100/\sqrt{\max(m,n_{win})}$;
- an indicator of an RPCA algorithm to apply such as ALM or APG;
- an indicator of a maximum number of iterations to perform by the indicated RPCA algorithm;
- an indicator of a convergence tolerance to determine when convergence has occurred perform by the indicated RPCA algorithm;
- an indicator of a low-rank decomposition algorithm such as singular value decomposition (SVD) or principal component analysis (PCA) (in general, PCA requires computing the covariance matrix first such that SVD may be appropriate when computing the covariance matrix is expensive, for example, when m is large;
- an indicator of parameters to output such as the low-rank data matrix for each observation $L_t$, the low-rank data matrix $L_T$, the sparse data matrix for each observation $S_t$, the sparse data matrix $S_T$, an error matrix that contains noise in dataset 124, the SVD diagonal vector, the SVD left vector, the SVD right vector, the value of rank r, a matrix of principal component loadings, a matrix of principal component scores, etc.;
- an indicator of where to store and/or to present the indicated output such as a name and a location of dataset decomposition description 126 or an indicator that the output is to a display in a table and/or is to be graphed, etc.;

The input parameters may vary based on the type of data of dataset 124 and may rely on the expertise of a domain expert.

In an operation 201, an iteration index t=1 is initialized.

In an operation 202, a determination is made concerning whether to use the $n_{start}$ observations to initialize the OMWRPCA algorithm. When the $n_{start}$ observations are used to initialize the OMWRPCA algorithm, processing continues in an operation 206. When the $n_{start}$ observations are not used to initialize the OMWRPCA algorithm, processing continues in an operation 204.

In operation 204, the rank r is set to the indicated value, a $U_0$ matrix is initialized to an (m×r) zero matrix, an $A_0$ matrix is initialized to an (r×r) zero matrix, a $B_0$ matrix is initialized to an (m×r) zero matrix, and processing continues in operation 210.

In operation 206, an initial observation matrix $M^s= [m_{-(n_{start}-1)}, \ldots, m_0]$ is selected from dataset 124, where m is an observation vector having the specified index in dataset 124. The user may or may not have an initial dataset available to select the initial observation matrix $M^s$. The user also may monitor the first few observations to determine an appropriate "burn-in period". The user may specify a first observation that is the burn-in number of observations after the beginning of dataset 124.

Figure 3:
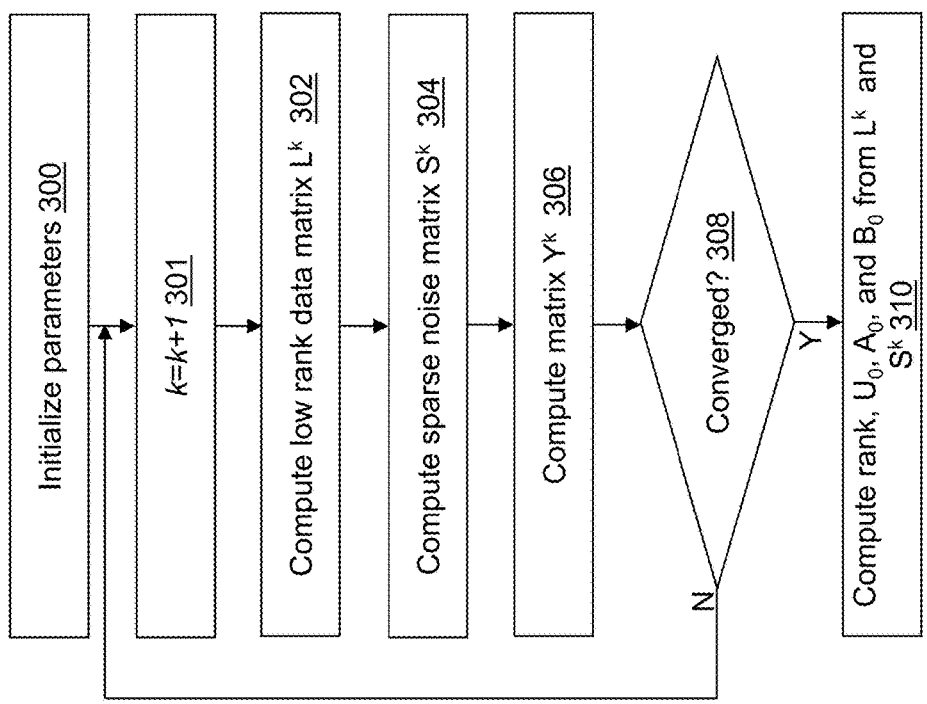
FIG. 3 depicts a flow diagram illustrating additional example operations performed by the monitoring device of FIG. 1 in accordance with an illustrative embodiment.

In an operation 208, the rank r, the $U_0$ matrix, the $A_0$ matrix, and the $B_0$ matrix are computed, for example, using RPCA-PCP-ALM as shown referring to FIG. 3 in accordance with an illustrative embodiment. Though RPCA-PCP-ALM is used for illustration, other PCA algorithms may be used to initialize the parameters described in other manners.

Referring to FIG. 3, example operations associated with decomposition application 122 performing RPCA-PCP-ALM are described. Additional, fewer, or different operations may be performed depending on the embodiment of decomposition application 122. The order of presentation of the operations of FIG. 3 is not intended to be limiting. Although some of the operational flows are presented in sequence, the various operations may be performed in various repetitions, concurrently (in parallel, for example, using threads and/or distributed computing system 130), and/or in other orders than those that are illustrated.

In an operation 300, the $S_0$ matrix and the $Y_0$ matrix are initialized to $(m \times n_{start})$ zero matrices, and index k=0 is initialized. $\mathcal{D}_{\mu^{-1}}$ is initialized as $\mathcal{D}_\tau(X) = US_\tau(E)V^*$, where $X=U\Sigma V^*$ is any singular value decomposition of $M^s$ as described above. $\mathcal{S}_{\lambda\mu^{-1}}$ is initialized by applying $S_\tau$ with $\tau=\lambda\mu^{-1}$ to shrink a residual of the decomposition.

In an operation 301, increment k using k=k+1.

In an operation 302, $L^k = \mathcal{D}_{\mu^{-1}}(M^s - S^{(k-1)} + \mu^{-1}Y^{(k-1)})$ is computed using the value of the second tuning parameter $\mu$.

In an operation 304, $S^k = \mathcal{S}_{\lambda\mu^{-1}}(M^s - L^k + \mu^{-1}Y^{(k-1)})$ is computed.

In an operation 306, $Y^k = Y^{(k-1)} + \mu(M^s - L^k + S^k)$ is computed.

In an operation 308, a determination is made concerning whether or not a solution has converged. When the solution has converged, processing continues in an operation 310. When the solution has not converged, processing continues in an operation 301 to repeat operations 301 to 308. For example, the maximum number of iterations and/or the convergence tolerance may be used to determine when convergence has occurred. For illustration, convergence may be determined when a Frobenius norm of a residual $M^s - L^k + S^k$ is smaller than a predefined tolerance that may be defined by a user or a default value may be used.

In operation 310, the rank r, the $U_0$ matrix, $A_t$, $B_t$, $s_0$ and $v_0$ are computed from the converged solution for $L^k$ and $S^k$, and processing continues in operation 210, where $L^k = [l_{-(n_{start}-1)}, \ldots, l_0] = [U_{-(n_{start}-1)}v_{-(n_{start}-1)}, \ldots, U_0v_0]$ and $S^k = [s_{-(n_{start}-1)}, \ldots, s_0]$. From SVD, $L^k = \hat{U}\hat{E}\hat{V}$, where $\hat{U} \in \mathbb{R}^{m \times r}$, $\hat{\Sigma} \in \mathbb{R}^{r \times r}$ and $\hat{V} \in \mathbb{R}^{r \times n_{start}}$. $U_0 = \hat{U}\hat{\Sigma}^{1/2} \in \mathbb{R}^{m \times r}$, $A_0 = \Sigma_{i=-(n_{start}-1)}^{0} v_i v_i^T \in \mathbb{R}^{r \times r}$, $B_0 = \Sigma_{i=-(n_{start}-1)}^{0} (m_i - s_i) v_i^T \in \mathbb{R}^{m \times r}$. The rank r of the r-dimensional linear subspace is a dimension of $\hat{U}$, $\hat{E}$, or $\hat{V}$. The $v_i$ vectors are the columns of $\hat{V}$ obtained from the SVD of $L^k$.

Referring again to FIG. 2, in operation 210, a next observation vector $m_t$, such as $m_1$ on a first iteration, $m_2$ on a second iteration, etc. is loaded from dataset 124. For example, the next observation vector $m_t$ is loaded by reading from dataset 124 or by receiving a next streamed observation vector.

Figure 4:
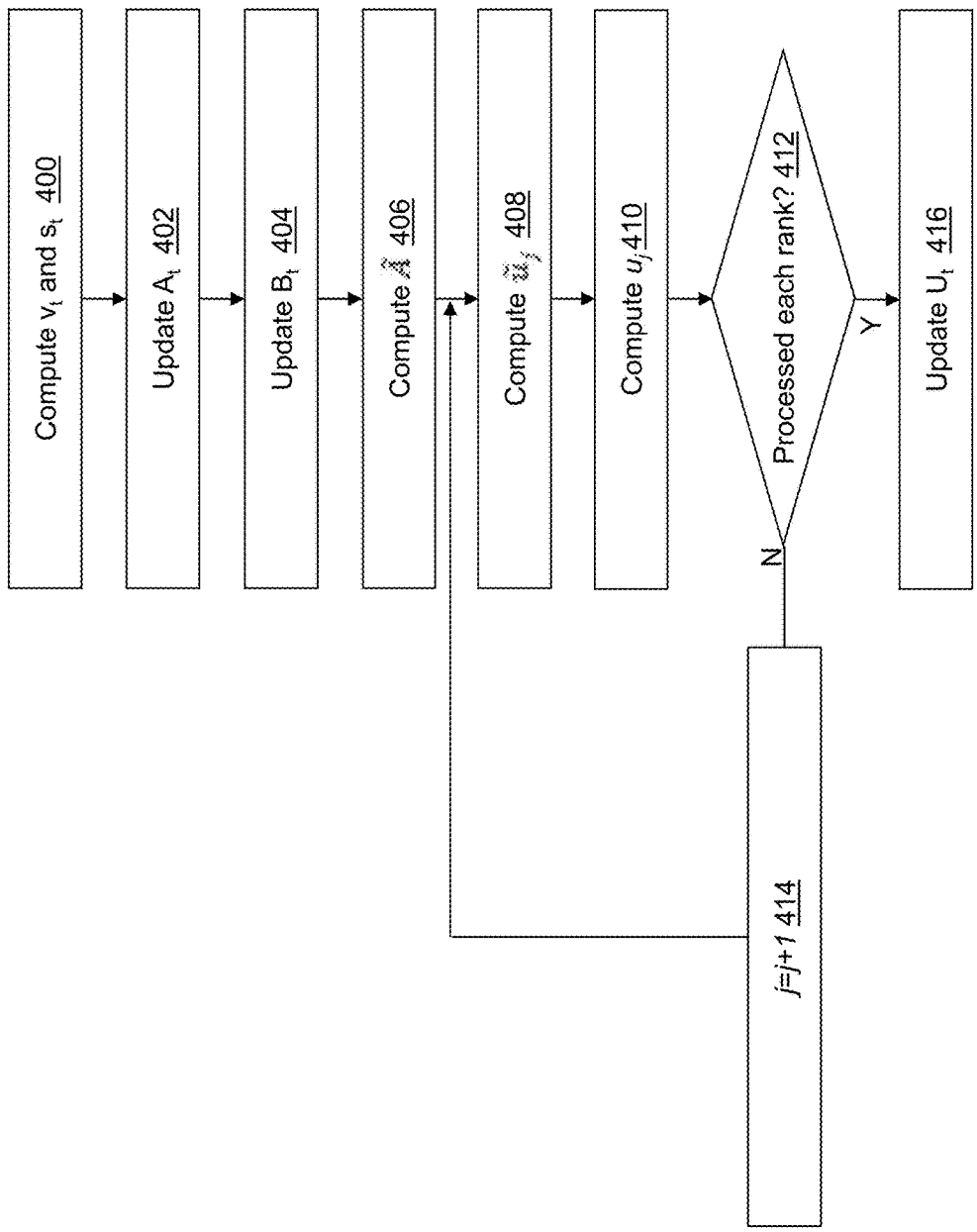
FIG. 4 depicts a flow diagram illustrating additional example operations performed by the monitoring device of FIG. 1 in accordance with an illustrative embodiment.

In an operation 212, a decomposition is computed using the loaded observation vector $m_t$ to update the $U_t$ matrix, the $A_t$ matrix, the $B_t$ matrix, $S_t$, and $v_t$, for example, using STOC-RPCA-PCP as shown referring to FIG. 4 modified to use the indicated value of $n_{win}$ in accordance with an illustrative embodiment.

Referring to FIG. 4, example operations associated with decomposition application 122 performing RPCA-PCP-ALM are described. Additional, fewer, or different operations may be performed depending on the embodiment of decomposition application 122. The order of presentation of the operations of FIG. 4 is not intended to be limiting.

In an operation 400, $v_t$ and $s_t$ are computed by solving the optimization problem $$(v_t, s_t) = \operatorname*{argmin}_{v,s} \frac{1}{2}\|m_t - U_{t-1}v - s\|_2^2 + \frac{\lambda_1}{2}\|v\|_2^2 + \lambda_2\|s\|_1.$$

In an operation 402, $A_t$ is computed using $A_t = A_{t-1} + v_t v_t^T - v_{t-n_{win}} v_{t-n_{win}}^T$, where the value $v_{t-n_{win}} v_{t-n_{win}}^T$ is removing the effect of the edge of the window.

In an operation 404, $B_t$ is computed using $B_t = B_{t-1} + (m_t - s_t)v_t^T - (m_{t-n_{win}} - s_{t-n_{win}})v_{t-n_{win}}^T$, where the value $(m_{t-n_{win}} - s_{t-n_{win}})v_{t-n_{win}}^T$ is removing the effect of the edge of the window.

In an operation 406, $\tilde{A}$ is computed using $\tilde{A} = A_t + \lambda_1 I$, where $A_t = [a_1, \ldots, a_r] \in \mathbb{R}^{r \times r}$, $\lambda_1$ is the value of the third tuning parameter, I is an identity matrix, $U_{t-1} = [u_1, \ldots, u_r] \in \mathbb{R}^{m \times r}$, $B_t = [b_1, \ldots b_r] \in \mathbb{R}^{r \times r}$, and $\tilde{A} = [\tilde{a}_1, \ldots, \tilde{a}_r] \in \mathbb{R}^{r \times r}$. A rank index j is initialized as j=1.

In an operation 408, $\tilde{u}_j$ is computed using $$\tilde{u}_j = \frac{1}{\tilde{A}[j,j]}(b_j - U_{t-1}\tilde{a}_j) + u_j.$$

In an operation 410, $u_j$ is computed using $$u_j = \frac{1}{\max(\|\tilde{u}_j\|_2, 1)}\tilde{u}_j.$$

In an operation 412, a determination is made concerning whether or not each rank has been processed, for example, by comparing the rank index j to the rank r. When each rank has been processed, processing continues in an operation 416. When each rank has not been processed, processing continues in an operation 414.

In operation 414, the rank index j is incremented as j=j+1, and processing continues in operation 408 to compute the next values.

In operation 416, $U_t$ is updated with the computed values of $u_j$, j=1, ... r, where $$U_t \triangleq \operatorname*{argmin} \frac{1}{2} Tr[U^T(A_t + \lambda_1 I)U^T - Tr(U^T B_t),$$

and processing continues in an operation 214 with the updated values of $A_t$, $B_t$, $U_t$, $v_t$, and $s_t$.

Referring again to FIG. 2, in operation 214, the low-rank matrix $L_T$, where $L_T = \{l_1, l_2, l_T\}$, is updated with values of $l_t = U_t v_t$ computed in operation 212, and the sparse noise matrix $S_T$, where $S_T = \{s_1, s_2, \ldots s_T\}$ is updated with the value of $s_t$ computed in operation 212.

In an operation 216, window decomposition data is output based on the indicated output selections. For example, one or more of $l_t$, $s_t$, $v_t$, $U_t$, $A_t$, $B_t$, etc. may be output by storing to dataset decomposition description 126, by presenting on display 116 in a table or a graph, by printing to printer 120 in a table or a graph, etc. Dataset decomposition description 126 may be stored on computer-readable medium 108 or on one or more computer-readable media of distributed computing system 130 and accessed by monitoring device 100 using communication interface 106, input interface 102, and/or output interface 104. Window decomposition data further may be output by sending to another display or printer of distributed computing system 130 and/or published to another computing device of distributed computing system 130 for further processing of the data in dataset 124 and/or of the window decomposition data. For example, monitoring of the window decomposition data may be used to determine whether or not a system is performing as expected.

In an operation 218, a determination is made concerning whether or not dataset 124 includes one or more unprocessed observation vector. When dataset 124 includes one or more unprocessed observation vector, processing continues in an operation 220. When dataset 124 does not include one or more unprocessed observation vector, processing continues in an operation 222. When dataset 124 is streamed to monitoring device 100, processing may wait until a full observation vector is received. When dataset 124 is not being streamed, the last observation vector may have been read from dataset 124. As another option, the value of T indicated by the user may be less than the number of observations included in dataset 124, in which case, processing continues to operation 222 when the number of iterations of operation 210 specified by the indicated value of T have been completed.

In operation 220, the iteration index t is incremented using t=t+1, and processing continues in operation 210 to load the next observation vector and repeat operations 210 to 218.

In operation 222, decomposition data is output based on the indicated output selections. For example, one or more of $L_T$, $S_T$, $U_T$, etc. may be output by storing to dataset decomposition description 126, by presenting on display 116 in a table or a graph, by printing to printer 120 in a table or a graph, etc. Dataset decomposition description 126 may be stored on computer-readable medium 108 or on one or more computer-readable media of distributed computing system 130 and accessed by monitoring device 100 using communication interface 106, input interface 102, and/or output interface 104. Decomposition data further may be output by sending to another display or printer of distributed computing system 130 and/or published to another computing device of distributed computing system 130 for further processing of the data in dataset 124 and/or of the decomposition data. For example, monitoring of the decomposition data may be used to determine whether or not a system is performing as expected. Decomposition data and/or window decomposition data may be selected for output.

Figure 5A:
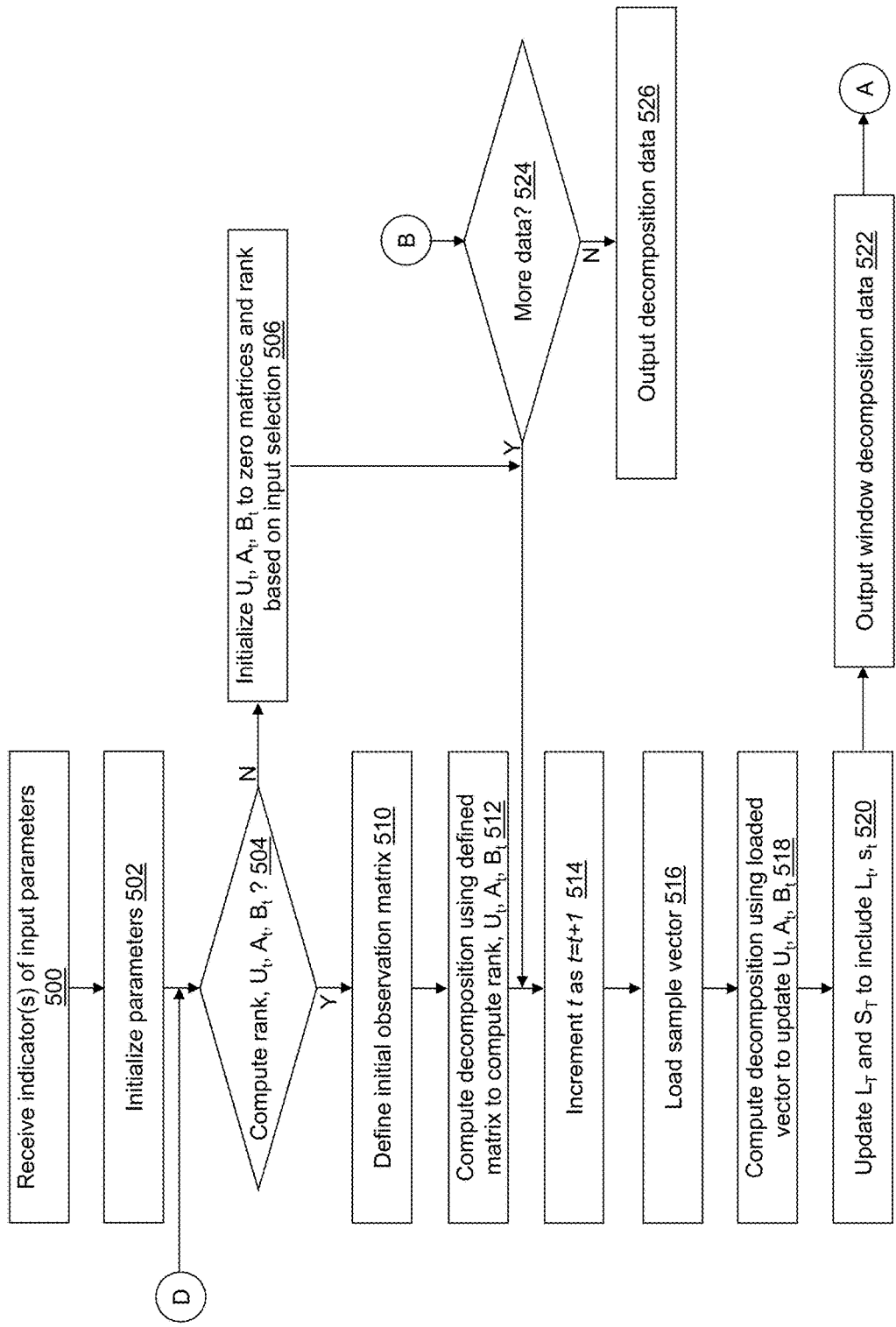
FIGS. 5A, 5B, and 5C depict a flow diagram illustrating additional example operations performed by the monitoring device of FIG. 1 in accordance with an illustrative embodiment.
Figure 5B:
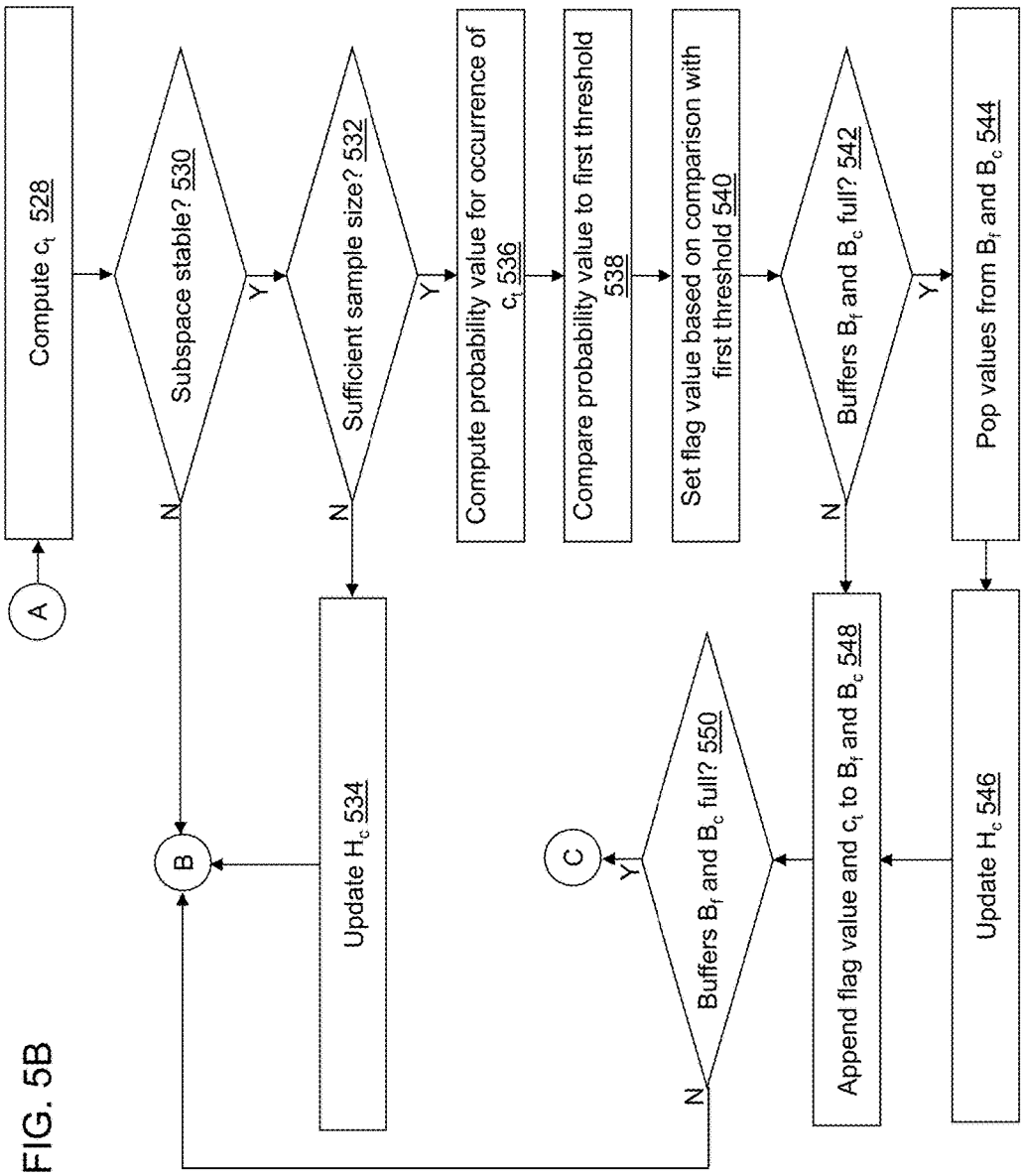
Figure 5C:
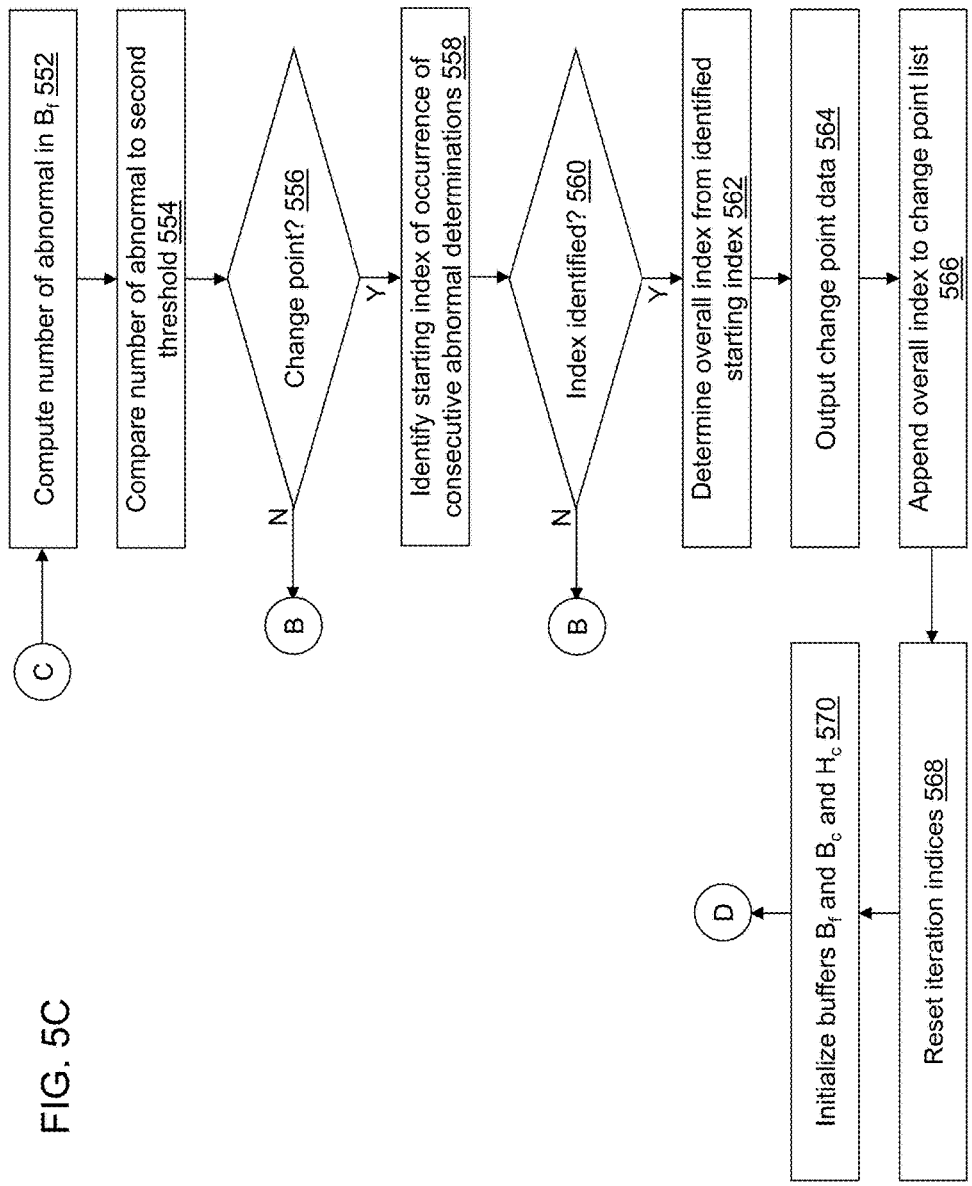

Referring to FIGS. 5A, 5B, and 5C, example operations associated with decomposition application 122 are described. Decomposition application 122 may implement an algorithm referenced herein as OMWRPCA with hypothesis testing (OMWRPCAHT). Additional, fewer, or different operations may be performed depending on the embodiment of decomposition application 122. The order of presentation of the operations of FIGS. 5A, 5B, and 5C is not intended to be limiting.

Similar to operation 200, in an operation 500, one or more indicators may be received that indicate values for input parameters used to define execution of decomposition application 122. As an example, the one or more indicators may be received by decomposition application 122 after selection from a user interface window, after entry by a user into a user interface window, read from a command line, read from a memory location of computer-readable medium 108 or of distributed computing system 130, etc. In an alternative embodiment, one or more input parameters described herein may not be user selectable. For example, a value may be used or a function may be implemented automatically or by default. Illustrative input parameters may include, but are not limited to:

the indicator of dataset 124;

the indicator of a plurality of variables of dataset 124 to define m;

the indicator of the value of T, the number of observations to process;

the indicator of the one or more rules associated with selection of an observation from the plurality of observations of dataset 124;

the indicator of the value of $n_{win}$, the window size for a number of observations;

the indicator of the value of $n_{start}$, the number of observations used to initialize the OMWRPCA algorithm;

the indicator of the value of rank r of the r-dimensional linear subspace that is not used if the $n_{start}$ observations are used initialize the OMWRPCA algorithm;

the indicator of whether to use the $n_{start}$ observations to initialize the OMWRPCA algorithm;

the indicator of the value of $\lambda$, the first tuning parameter;

the indicator of the value of $\mu$, the second tuning parameter;

the indicator of the value of $\lambda_1$, the third tuning parameter;

the indicator of the value of $\lambda_2$, the fourth tuning parameter;

the indicator of the RPCA algorithm to apply such as ALM or APG;

the indicator of the maximum number of iterations to perform by the indicated RPCA algorithm;

the indicator of the convergence tolerance to determine when convergence has occurred perform by the indicated RPCA algorithm;

the indicator of the low-rank decomposition algorithm;

an indicator of $n_{stable}$, a first observation window length to process for a stable operation of OMWRPCA where a default value may be $n_{stable}=n_{win}$;

an indicator of $n_{sample}$, a second observation window length to process after $n_{stable}$ observations and before a start of hypothesis testing where a default value may be $n_{sample}=n_{win}/2$;

an indicator of $\alpha$, an abnormal observation threshold to indicate an abnormal observation where a default value may be $\alpha=0.01$;

an indicator of $N_{check}$, a buffer window length for hypothesis testing, that may be less than $n_{win}/2$ to avoid missing a change point, but not too small to generate an inordinate number of false alarms (for illustration, $N_{check}=n_{win}/10$ may be a default value);

an indicator of $n_{prob}$, a change point threshold that defines a number of observations within the buffer window length used to indicate a change point within a current buffer window where a default value may be $n_{prob}=\alpha_{prob}N_{check}$, where $\alpha_{prob}=0.5$ is a default value though the value can be selected based on typical rates of change and ranges of variation in the operating regime of dataset 124, where noisier signals may use longer windows to average out the noise and fast-changing systems need shorter windows to capture the change points;

an indicator of $n_{positive}$, a number of consecutive abnormal indicators to identify a change point where $n_{positive}=3$ is a default value;

an indicator of $n_{tol}$, a tolerance parameter that may have a default value of zero;

the indicator of parameters to output such as the low-rank data matrix for each observation $L_t$, the low-rank data matrix $L_T$, the sparse data matrix for each observation $S_t$, the sparse data matrix $S_T$, an error matrix that contains noise in dataset 124, the SVD diagonal vector, the SVD left vector, the SVD right vector, a matrix of principal component loadings, a matrix of principal component scores, a change point index, a change point value, etc.;

the indicator of where to store and/or to present the indicated output such as a name and a location of dataset decomposition description 126 or an indicator that the output is to a display in a table and/or is to be graphed, etc.;

the indicator of where to store and/or to present the indicated output such as a name and a location of dataset change points description 128 or an indicator that the output is to a display in a table and/or is to be graphed, etc.;

In an operation 502, iteration indices $t=0$ and $t_{start}=0$ are initialized. Additionally, a zero counter vector $H_c$ is initialized to a $0^{m+1}$ zero vector, a flag buffer list $B_f$ is initialized as an empty list, and a zero count buffer list $B_c$ is initialized as an empty list.

Similar to operation 202, in an operation 504, a determination is made concerning whether to use the $n_{start}$ observations to initialize the OMWRPCA algorithm. When the $n_{start}$ observations are used to initialize the OMWRPCA algorithm, processing continues in an operation 510. When the $n_{start}$ observations are not used to initialize the OMWR-PCA algorithm, processing continues in an operation 506.

Similar to operation 204, in operation 506, the rank r is set to the indicated value, a $U_0$ matrix is initialized to an (m×r) zero matrix, an $A_0$ matrix is initialized to an (r×r) zero matrix, a $B_0$ matrix is initialized to an (m×r) zero matrix, and processing continues in operation 514.

Similar to operation 206, in operation 510, an initial observation matrix $M^s=[m_{-(n_{start}-1)}, \ldots, m_0]$ is selected from dataset 124, where m is an observation vector having the specified index in dataset 124.

Similar to operation 208, in an operation 512, the rank r, the $U_0$ matrix, the $A_0$ matrix, and the $B_0$ matrix are computed, for example, using RPCA-PCP-ALM as shown referring to FIG. 3 in accordance with an illustrative embodiment. Though RPCA-PCP-ALM is used for illustration, other PCA algorithms may be used to initialize the parameters described in other manners.

Similar to operation 220, in operation 514, the iteration index t is incremented using $t=t+1$.

Similar to operation 210, in an operation 516, a next observation vector $m_t$, such as $m_1$ on a first iteration, $m_2$ on a second iteration, etc. is loaded from dataset 124. For example, the next observation vector $m_t$ is loaded by reading from dataset 124 or by receiving a next streamed observation vector.

Similar to operation 212, in an operation 518, a decomposition is computed using the loaded observation vector $m_t$ to update the $U_t$ matrix, $A_t$, $B_t$, $s_t$, and $v_t$, for example, using STOC-RPCA-PCP as shown referring to FIG. 4 modified to use the indicated value of $n_{win}$ in accordance with an illustrative embodiment.

Similar to operation 214, in an operation 520, the low-rank matrix $L_T$, where $L_T=\{l_1, l_2, \ldots, l_T\}$, is updated with values of $l_t=U_t v_t$ computed in operation 518, and the sparse noise matrix $S_T$, where $S_T=\{s_1, s_2, \ldots s_T\}$ is updated with the value of $s_t$ computed in operation 518.

Similar to operation 216, in an operation 522, window decomposition data is output based on the indicated output selections, and processing continues in operation 528 shown referring to FIG. 5B.

Similar to operation 218, in an operation 524, a determination is made concerning whether or not dataset 124 includes one or more unprocessed observation vector. When dataset 124 includes one or more unprocessed observation vector, processing continues in operation 514 to load the next observation vector and repeat one or more of operations 514 to 570. When dataset 124 does not include one or more unprocessed observation vector, processing continues in an operation 526.

Similar to operation 222, in operation 526, decomposition data is output based on the indicated output selections.

Referring to FIG. 5B, in operation 528, a zero counter time series value $\hat{c}_t$ is computed using $\hat{c}_t=\Sigma_{i=1}^{m} s_t[i]$.

In an operation 530, a determination is made concerning whether or not the subspace is stable. When the subspace is stable, processing continues in operation 532. When the subspace is not stable, processing continues in operation 524. Stability may be based on processing a number of additional observation vectors $m_t$ based on the indicated first observation window length $n_{stable}$. For example, when $t>n_{stable}+t_{start}$ or when $t\geq n_{stable}+t_{start}$, the subspace may be determined to be stable.

In an operation 532, a determination is made concerning whether or not a sufficient hypothesis sample size has been processed. When the sufficient hypothesis sample size has been processed, processing continues in operation 536. When the sufficient hypothesis sample size has not been processed, processing continues in operation 534. The sufficient hypothesis sample size may be based on processing a number of additional observation vectors $m_t$ based on the indicated second observation window length $n_{sample}$. For example, when $t>n_{stable}+n_{sample}+t_{start}$ or when $t\geq n_{stable}+n_{sample}+t_{start}$, the sufficient sample size has been processed. Hypothesis testing is performed on each subsequent observation vector $m_t$.

In operation 534, zero counter vector $H_c$ is updated as $H_c[\hat{c}_t+1]=H_c[\hat{c}_t+1]+1$, and processing continue in operation 524 to process a next observation vector. Zero counter vector $H_c$ maintains a count of a number of times each value of $\hat{c}_t$ occurs in a current stable period after the last change point.

In operation 536, a probability value p is computed for $\hat{c}_t$ using $p=\Sigma_{i=\hat{c}_t+1}^{m+1} H_c[i]/\Sigma_{i=0}^{m+1} H_c[i]$. Probability value p is a probability that a sparse noise vector includes at least as many nonzero elements as the current observation vector $m_t$.

In an operation 538, the computed probability value p is compared to the abnormal observation threshold $\alpha$.

In an operation 540, a flag value $f_t$ is set to zero or one based on the comparison. The flag value $f_t$ is an indicator of whether or not the current observation vector $m_t$ is abnormal in comparison to previous observation vectors. For example, $f_t=1$ when $p<\alpha$, or when $p\leq\alpha$ to indicate that the current observation vector $m_t$ is abnormal, and otherwise, $f_t=0$. Of course, other flag settings and comparisons may be used as understood by a person of skill in the art. For example, $f_t=1$ may indicate an abnormal observation.

In an operation 542, a determination is made concerning whether or not flag buffer list $B_f$ and zero count buffer list $B_c$ are full. When the buffer lists are full, processing continues in an operation 544. When the buffer lists are not full, processing continues in an operation 548. For example, flag buffer list $B_f$ and zero count buffer list $B_c$ may be full when their length is $N_{check}$.

In operation 544, a first value in flag buffer list $B_f$ and in zero count buffer list $B_c$ is popped from each list to make room for another item at an end of each buffer list, where c is the value popped from $B_c$.

In an operation 546, the $H_c$ vector is updated as $H_c[c+1]=H_c[c+1]+1$. $H_c$ is a zero counter vector that maintains a count of a number of times each value of $\hat{c}_t$ equals the total number of nonzero components of the estimated sparse vector in the current stable period after the last change point.

In operation 548, the flag value $f_t$ is appended to an end of flag buffer list $B_f$, and $\hat{c}_t$ is appended to an end of zero count buffer list $B_c$.

In an operation 550, a determination is made concerning whether or not flag buffer list $B_f$ and zero count buffer list $B_c$ are now full. When the buffer lists are now full, processing continues in an operation 552 shown referring to FIG. 5C. When the buffer lists are not now full, processing continues in operation 524. For example, flag buffer list $B_f$ and zero count buffer list $B_c$ may be full when their length is $N_{check}$.

Referring to FIG. 5C, hypothesis testing is performed. In operation 552, a number of abnormal values $n_{abnormal}$ is computed from flag buffer list $B_f$ using $n_{abnormal}=\Sigma_{i=1}^{N_{check}} B_f[i]$.

In an operation 554, the computed number of abnormal values $n_{abnormal}$ is compared to the change point threshold $n_{prob}$.

In an operation 556, a determination is made concerning whether or not a change point has occurred based on the comparison. When the change point has occurred, processing continues in an operation 558. When the change point has not occurred, processing continues in operation 524. For example, when $n_{abnormal}>n_{prob}$, or when $n_{abnormal}\geq n_{prob}$, a change point has occurred in the most recent $N_{check}$ number of observation vectors.

In an operation 558, a buffer starting index $t_{bufstt}$ is identified by looping through entries in flag buffer list $B_f$ from a start of the list to an end of the list to identify occurrence of a change point, which is detected as a first instance of the number of consecutive abnormal indicators (i.e., $f_t=1$) $n_{positive}$ in flag buffer list $B_f$. For example, if $B_f[n1]$, $B_f[n1+1]$, ..., $B_f[n1+n_{positive}-1]$ are the first occurrence of the $n_{positive}$ consecutive abnormal flag values, n1 is the buffer starting index $t_{bufstt}$.

In an operation 560, a determination is made concerning whether or not a buffer starting index $t_{bufstt}$ was identified. When the buffer starting index $t_{bufstt}$ was identified, processing continues in an operation 562. When the buffer starting index $t_{bufstt}$ was not identified, processing continues in operation 524.

In operation 562, an overall index $t_{ov}$ is determined for the observation vector associated with the change point based on a current value of t as $t_{ov}=t-N_{check}+t_{bufstt}$. Typically, only the time of the change point is important. However, if the change point vector is needed, it is stored and can be extracted using overall index $t_{ov}$.

In an operation 564, change point data is output based on the indicated output selections. For example, $m_{t_{ov}}$ may be output by storing to dataset change point description 128, by presenting on display 116 in a table or a graph, by printing to printer 120 in a table or a graph, etc. Dataset change point description 128 may be stored on computer-readable medium 108 or on one or more computer-readable media of distributed computing system 130 and accessed by monitoring device 100 using communication interface 106, input interface 102, and/or output interface 104. Change point data $m_{t_{ov}}$ further may be output by sending to another display or printer of distributed computing system 130 and/or published to another computing device of distributed computing system 130 for further processing of the data in dataset 124 and/or of the decomposition data. For example, monitoring of the change point data may be used to determine whether or not a system is performing as expected. Change point data further may include output that is associated with $m_{t_{ov}}$ such as of $l_{t_{ov}}$, $s_{t_{ov}}$, $v_{t_{ov}}$, $U_{t_{ov}}$, $A_{t_{ov}}$, $B_{t_{ov}}$), etc. For example, an alert may be sent when a change point is identified. The alert may include a reference to $t_{ov}$ or to $m_{t_{ov}}$ or to $l_{t_{ov}}$, $s_{t_{ov}}$, $v_{t_{ov}}$, $U_{t_{ov}}$, $A_{t_{ov}}$, $B_{t_{ov}}$, etc.

In an operation 566, $t_{ov}$ may be appended to a change point list.

In an operation 568, iteration index t is reset to $t=t_{ov}$ and $t_{start}=t_{ov}$ are initialized In an operation 570, the H, vector is initialized to the $0^{m+1}$ zero vector, the flag buffer list $B_f$ is initialized as the empty list, and the zero count buffer list $B_c$ is initialized as the empty list, and processing continues in operation 504 of FIG. 5A to restart from the identified change point vector. Processing may continue as windows of data are received or read from dataset 124 until processing is stopped.

Figure 7:
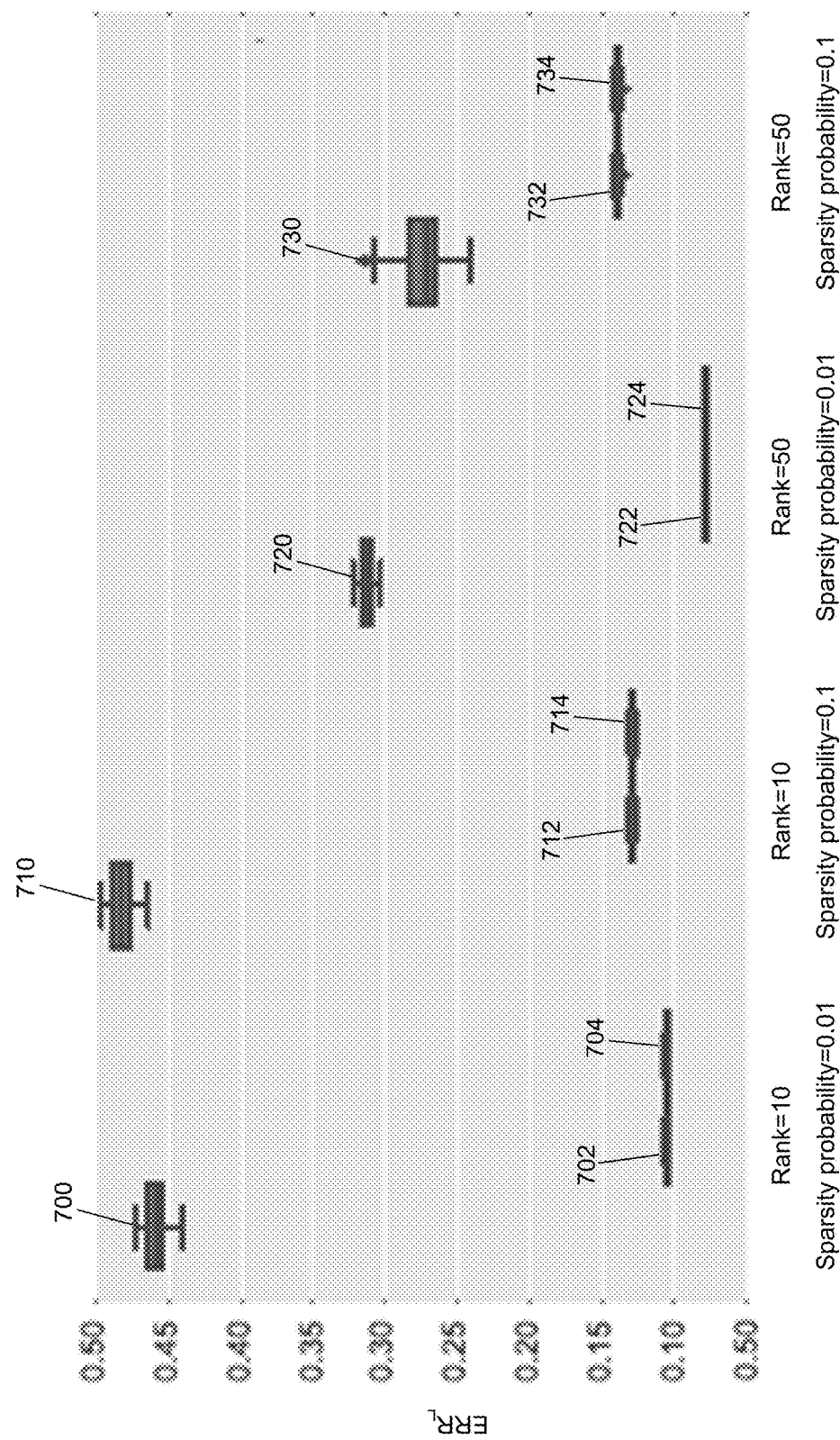
FIG. 7 provides a comparison between a relative error computed for a low-rank matrix using a known robust principal component analysis (RPCA) algorithm, using the operations of FIGS. 2-4, and using the operations of FIGS. 3-5 with a slowly changing subspace in accordance with an illustrative embodiment.

Referring to FIG. 7, a comparison between a relative error computed for the low-rank matrix using three different algorithms is shown in accordance with an illustrative embodiment. The first algorithm is the known RPCA algorithm described by FIG. 4 without use of windows or initialization based on the operations of FIG. 3 also indicated as STOC-RPCA-PCP. The second algorithm uses the operations of FIGS. 2-4 with windowing and initialization based on the operations of FIG. 3 also indicated as OMWRPCA. The third algorithm uses the operations of FIGS. 3-5 with windowing and initialization based on the operations of FIG. 3 and hypothesis testing also indicated as OMWRPCAHT.

The comparison was based on data with a slowly changing subspace. The observation vectors in the slowly changing subspace were generated through M=L+S, where S is the sparse noise matrix with a fraction of a sparsity probability p of non-zero elements. The non-zero elements of S were randomly chosen and generated from a uniform distribution over the interval of [−1000, 1000]. The low-rank subspace L was generated as a product L=UV, where the sizes of U and V are m×r and m×T, respectively. The elements of both U and V are independent and identically distributed (i.i.d.) samples from the $\mathcal{N}$ (0,1) distribution. U was the basis of the constant subspace with dimension r. T=5000 and m=400 were used to generate the observation vectors M. An $n_{start}$ number of observation vectors with size 400×200 was also generated. Four combinations of (r,p) were generated: 1) (10, 0.01), (10, 0.1), (50, 0.01), and (50, 0.1). For each combination, 50 replications were run using the following parameters for each simulation study, $\lambda_1=1/\sqrt{400}$, $\lambda_2=100/\sqrt{400}$, $n_{win}=200$, $n_{start}=200$, $n_{stable}=200$, $n_{sample}=100$, $N_{check}=20$, $n_{prob}=0.5N_{check}$, $\alpha=0.01$, $n_{positive}=3$, and, $n_{ro}=0$. Subspace U was changed linearly after generating $U_0$ by adding new matrices $\{\tilde{U}_k\}_{k=1}^{K}$ that were generated independently with i.i.d. $\mathcal{N}$ (0,1) elements added to the first $r_0$ columns of U, where $\tilde{U}_k \in \mathbb{R}^{m \times r_0}$, k=1, ..., K and $$K = \frac{T}{T_p} \cdot T_p = 250$$

and $r_0=5$ were used. Specifically, for $t=T_p*i+j$, where $$i = 0, \ldots, K-1, j = 0, \ldots, T_p - 1,$$

$$U_t[:,1:r_0] = U_0[:,1:r_0] + \sum_{1 \le k \le i} \tilde{U}_k + \frac{j}{T_p}\tilde{U}_{i+1},$$

$$U_t[:,(r_0+1):r] = U_0[:,(r_0+1):r]$$

was used to generate the slowly changing subspace observation vectors.

The comparison between the relative error computed for the low-rank matrix using the three different algorithms and the slowly changing subspace is shown for each simulation study using a box plot for each. For example, a first box plot 700 shows results for the first algorithm with (10, 0.01), where (r=10, p=0.01), a second box plot 702 shows results for the second algorithm with (10, 0.01), and a third box plot 704 shows results for the third algorithm with (10, 0.01). A fourth box plot 710 shows results for the first algorithm with (10, 0.1), a fifth box plot 712 shows results for the second algorithm with (10, 0.1), and a sixth box plot 714 shows results for the third algorithm with (10, 0.1). A seventh box plot 720 shows results for the first algorithm with (50, 0.01), an eighth box plot 722 shows results for the second algorithm with (50, 0.01), and a ninth box plot 724 shows results for the third algorithm with (50, 0.01). A tenth box plot 730 shows results for the first algorithm with (50, 0.1), an eleventh box plot 732 shows results for the second algorithm with (50, 0.1), and a twelfth box plot 734 shows results for the third algorithm with (50, 0.1).

Figure 8:
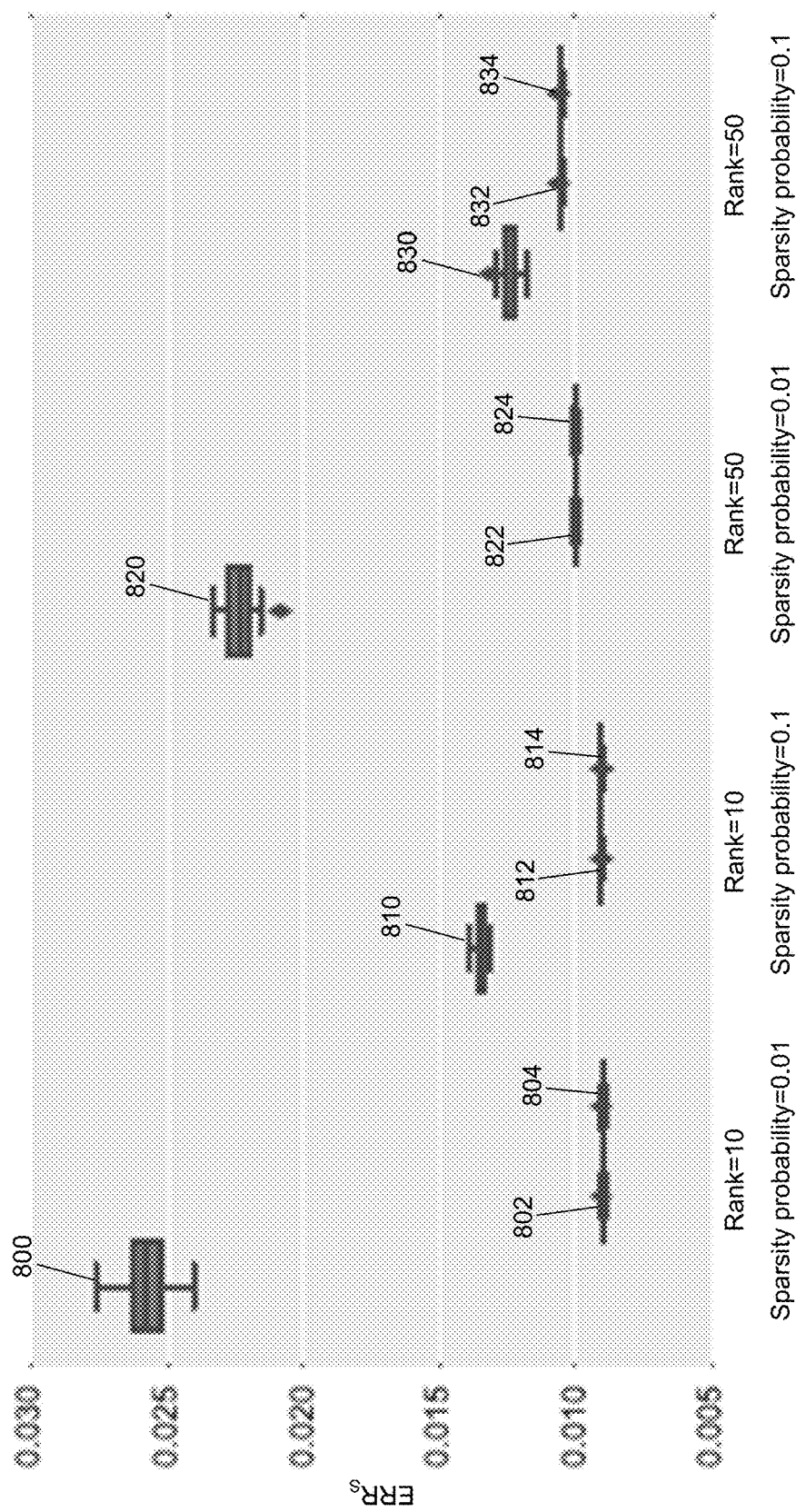
FIG. 8 provides a comparison between a relative error computed for a sparse noise matrix using the known RPCA algorithm, using the operations of FIGS. 2-4, and using the operations of FIGS. 3-5 with the slowly changing subspace in accordance with an illustrative embodiment.

Referring to FIG. 8, a comparison between a relative error computed for the sparse noise matrix using the three different algorithms and the slowly changing subspace is shown for each simulation study using a box plot for each in accordance with an illustrative embodiment. For example, a first box plot 800 shows results for the first algorithm with (10, 0.01), where (r=10, p=0.01), a second box plot 802 shows results for the second algorithm with (10, 0.01), and a third box plot 804 shows results for the third algorithm with (10, 0.01). A fourth box plot 810 shows results for the first algorithm with (10, 0.1), a fifth box plot 812 shows results for the second algorithm with (10, 0.1), and a sixth box plot 814 shows results for the third algorithm with (10, 0.1). A seventh box plot 820 shows results for the first algorithm with (50, 0.01), an eighth box plot 822 shows results for the second algorithm with (50, 0.01), and a ninth box plot 824 shows results for the third algorithm with (50, 0.01). A tenth box plot 830 shows results for the first algorithm with (50, 0.1), an eleventh box plot 832 shows results for the second algorithm with (50, 0.1), and a twelfth box plot 834 shows results for the third algorithm with (50, 0.1).

Figure 9:
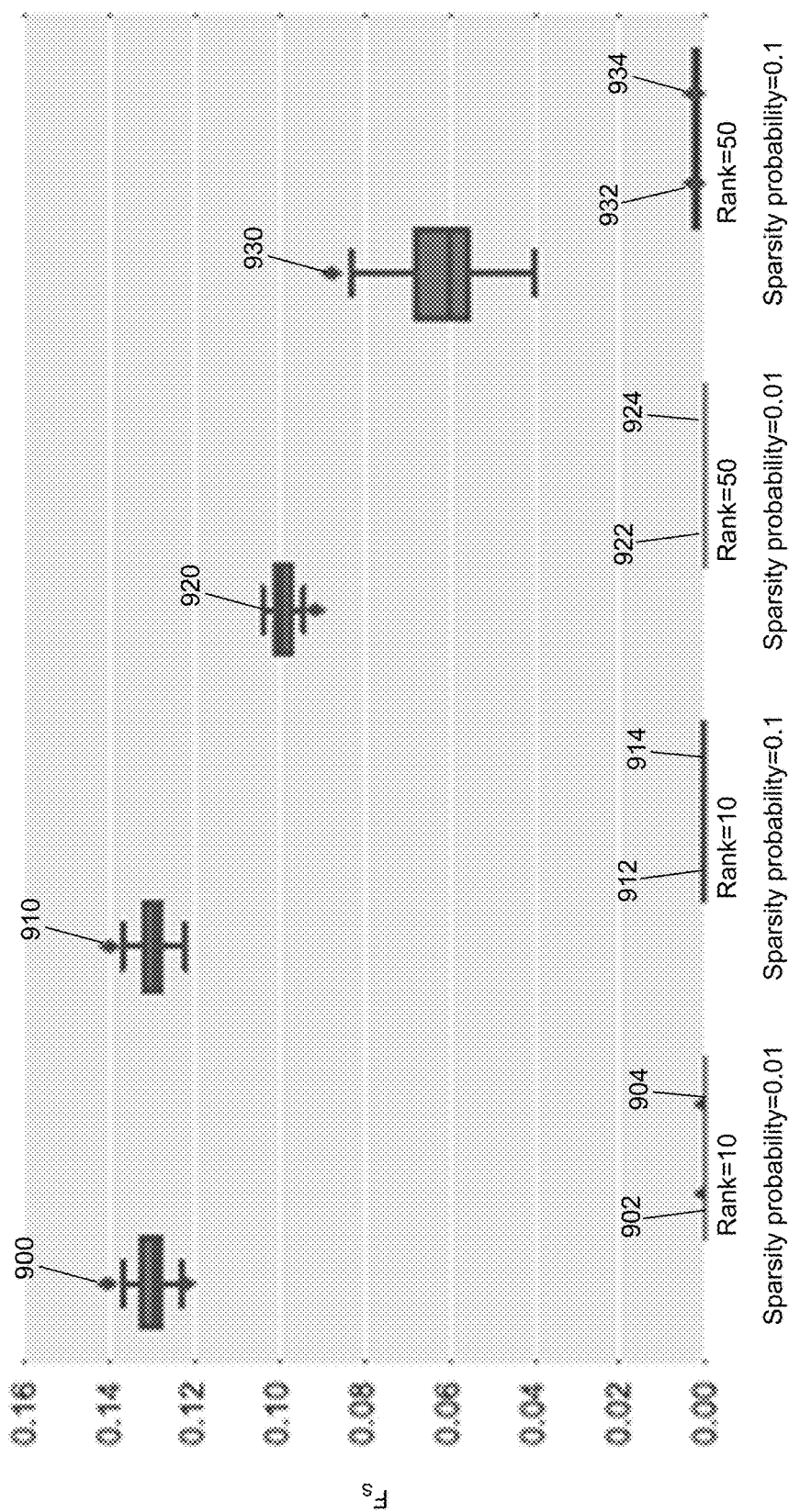
FIG. 9 provides a comparison between a proportion of correctly identified elements in the sparse noise matrix using the known RPCA algorithm, using the operations of FIGS. 2-4, and using the operations of FIGS. 3-5 with the slowly changing subspace in accordance with an illustrative embodiment.

Referring to FIG. 9, a comparison between a proportion of correctly identified elements in the sparse noise matrix using the three different algorithms and the slowly changing subspace is shown for each simulation study using a box plot for each in accordance with an illustrative embodiment. For example, a first box plot 900 shows results for the first algorithm with (10, 0.01), where (r=10, p=0.01), a second box plot 902 shows results for the second algorithm with (10, 0.01), and a third box plot 904 shows results for the third algorithm with (10, 0.01). A fourth box plot 910 shows results for the first algorithm with (10, 0.1), a fifth box plot 912 shows results for the second algorithm with (10, 0.1), and a sixth box plot 914 shows results for the third algorithm with (10, 0.1). A seventh box plot 920 shows results for the first algorithm with (50, 0.01), an eighth box plot 922 shows results for the second algorithm with (50, 0.01), and a ninth box plot 924 shows results for the third algorithm with (50, 0.01). A tenth box plot 930 shows results for the first algorithm with (50, 0.1), an eleventh box plot 932 shows results for the second algorithm with (50, 0.1), and a twelfth box plot 934 shows results for the third algorithm with (50, 0.1).

Referring to FIG. 10, a comparison as a function of time between the relative error computed for the low-rank matrix using the three different algorithms with a rank of 10, a sparsity probability of 0.01, and the slowly changing subspace is shown in accordance with an illustrative embodiment. A first curve 1000 shows results for the first algorithm, and a second curve 1002 shows results for the second algorithm and the third algorithm. As expected, in a slowly changing subspace, the second and third algorithms perform similarly and much better than the first algorithm that is not responsive to the changing subspace.

Referring to FIG. 11, a comparison as a function of time between the relative error computed for the low-rank matrix using the three different algorithms with a rank of 50, a sparsity probability of 0.01, and the slowly changing subspace is shown in accordance with an illustrative embodiment. A third curve 1100 shows results for the first algorithm, and a fourth curve 1102 shows results for the second algorithm and the third algorithm.

Referring to FIG. 12, a comparison between a relative error computed for the low-rank matrix using the three different algorithms is shown in accordance with an illustrative embodiment. The comparison was based on data with two abrupt changes in the subspace at t=1000 and t=2000. T=3000 was used. The same parameters used to create the slowly changing subspace observation vectors were used to generate the with two abrupt, where the underlying subspaces U were changed and generated completely independently for each time window [0,1000], [1000,2000], and [2000,3000].

For example, a first box plot 1200 shows results for the first algorithm with (10, 0.01), a second box plot 1202 shows results for the second algorithm with (10, 0.01), and a third box plot 1204 shows results for the third algorithm with (10, 0.01). A fourth box plot 1210 shows results for the first algorithm with (10, 0.1), a fifth box plot 1212 shows results for the second algorithm with (10, 0.1), and a sixth box plot 1214 shows results for the third algorithm with (10, 0.1). A seventh box plot 1220 shows results for the first algorithm with (50, 0.01), an eighth box plot 1222 shows results for the second algorithm with (50, 0.01), and a ninth box plot 1224 shows results for the third algorithm with (50, 0.01). A tenth box plot 1230 shows results for the first algorithm with (50, 0.1), an eleventh box plot 1232 shows results for the second algorithm with (50, 0.1), and a twelfth box plot 1234 shows results for the third algorithm with (50, 0.1).

Referring to FIG. 13, a comparison between a relative error computed for the sparse noise matrix using the three different algorithms and with two abrupt changes in the subspace is shown in accordance with an illustrative embodiment. For example, a first box plot 1300 shows results for the first algorithm with (10, 0.01), where (r=10, p=0.01), a second box plot 1302 shows results for the second algorithm with (10, 0.01), and a third box plot 1304 shows results for the third algorithm with (10, 0.01). A fourth box plot 1310 shows results for the first algorithm with (10, 0.1), a fifth box plot 1312 shows results for the second algorithm with (10, 0.1), and a sixth box plot 1314 shows results for the third algorithm with (10, 0.1). A seventh box plot 1320 shows results for the first algorithm with (50, 0.01), an eighth box plot 1322 shows results for the second algorithm with (50, 0.01), and a ninth box plot 1324 shows results for the third algorithm with (50, 0.01). A tenth box plot 1330 shows results for the first algorithm with (50, 0.1), an eleventh box plot 1332 shows results for the second algorithm with (50, 0.1), and a twelfth box plot 1334 shows results for the third algorithm with (50, 0.1).

Referring to FIG. 14, a comparison between a proportion of correctly identified elements in the sparse noise matrix using the three different algorithms and with two abrupt changes in the subspace is shown in accordance with an illustrative embodiment. For example, a first box plot 1400 shows results for the first algorithm with (10, 0.01), where (r=10, p=0.01), a second box plot 1402 shows results for the second algorithm with (10, 0.01), and a third box plot 1404 shows results for the third algorithm with (10, 0.01). A fourth box plot 1410 shows results for the first algorithm with (10, 0.1), a fifth box plot 1412 shows results for the second algorithm with (10, 0.1), and a sixth box plot 1414 shows results for the third algorithm with (10, 0.1). A seventh box plot 1420 shows results for the first algorithm with (50, 0.01), an eighth box plot 1422 shows results for the second algorithm with (50, 0.01), and a ninth box plot 1424 shows results for the third algorithm with (50, 0.01). A tenth box plot 1430 shows results for the first algorithm with (50, 0.1), an eleventh box plot 1432 shows results for the second algorithm with (50, 0.1), and a twelfth box plot 1434 shows results for the third algorithm with (50, 0.1).

Figure 15:
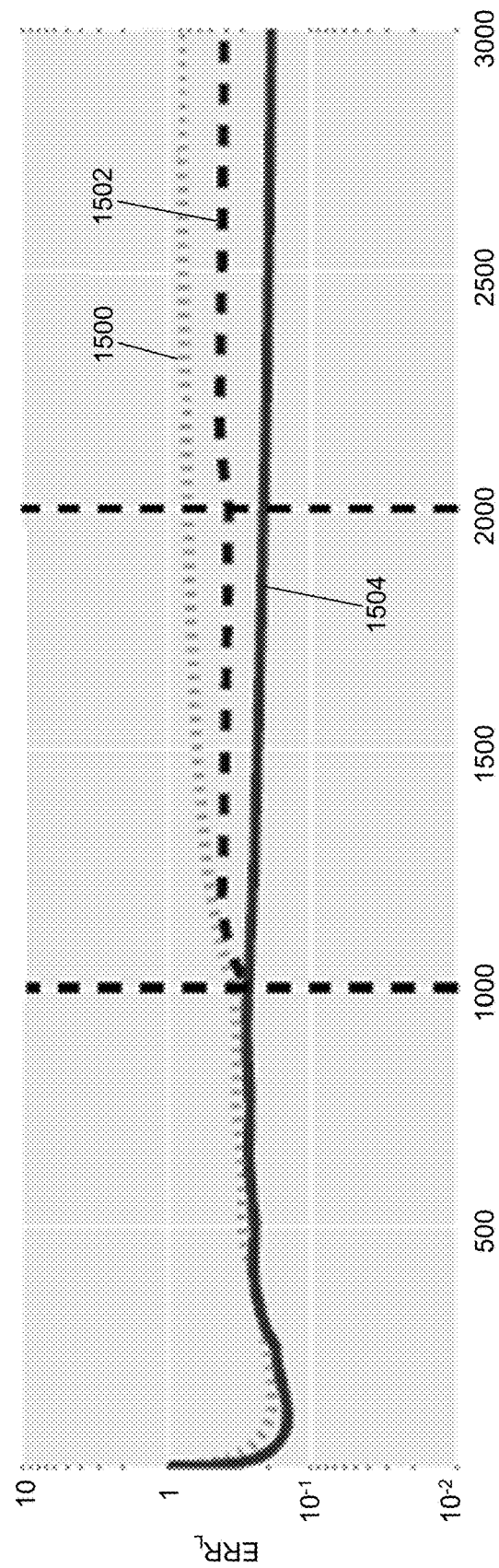
FIG. 15 provides a comparison as a function of time between the relative error computed for the low-rank matrix using the known RPCA algorithm, using the operations of FIGS. 2-4, and using the operations of FIGS. 3-5 with a rank of 10, a sparsity probability of 0.01, and the two abrupt changes in the subspace in accordance with an illustrative embodiment.

Referring to FIG. 15, a comparison as a function of time between the relative error computed for the low-rank matrix using the three different algorithms with a rank of 10, a sparsity probability of 0.01, and with two abrupt changes in the subspace is shown in accordance with an illustrative embodiment. A first curve 1500 shows results for the first algorithm, a second curve 1502 shows results for the second algorithm, and a third curve 1504 shows results for the third algorithm.

Figure 16:
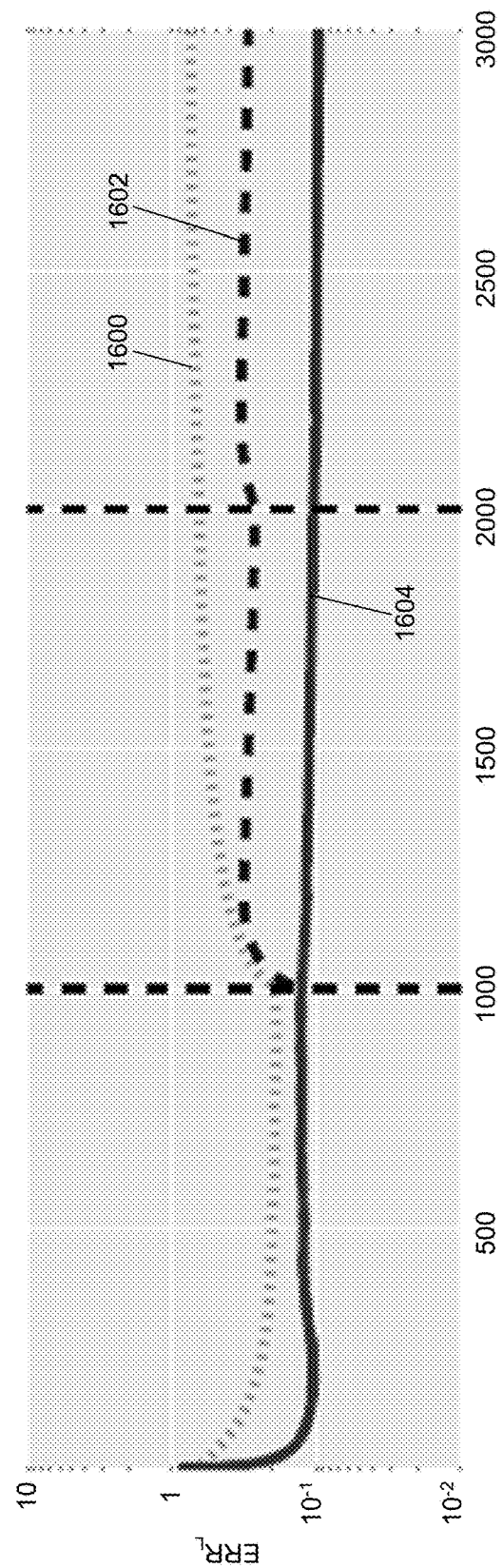
FIG. 16 provides a comparison as a function of time between the relative error computed for the low-rank matrix using the known RPCA algorithm, using the operations of FIGS. 2-4, and using the operations of FIGS. 3-5 with a rank of 50, a sparsity probability of 0.01, and the two abrupt changes in the subspace in accordance with an illustrative embodiment.

Referring to FIG. 16, a comparison as a function of time between the relative error computed for the low-rank matrix using the three different algorithms with a rank of 50, a sparsity probability of 0.01, and with two abrupt changes in the subspace is shown in accordance with an illustrative embodiment. A first curve 1600 shows results for the first algorithm, a second curve 1602 shows results for the second algorithm, and a third curve 1604 shows results for the third algorithm.

Referring to FIGS. 12-16, as expected, in an abruptly changing subspace, the second algorithm performed much better than the first algorithm that is not responsive to the changing subspace. The third algorithm performed much better than the second algorithm that is not responsive to the abrupt changes.

Figure 17:
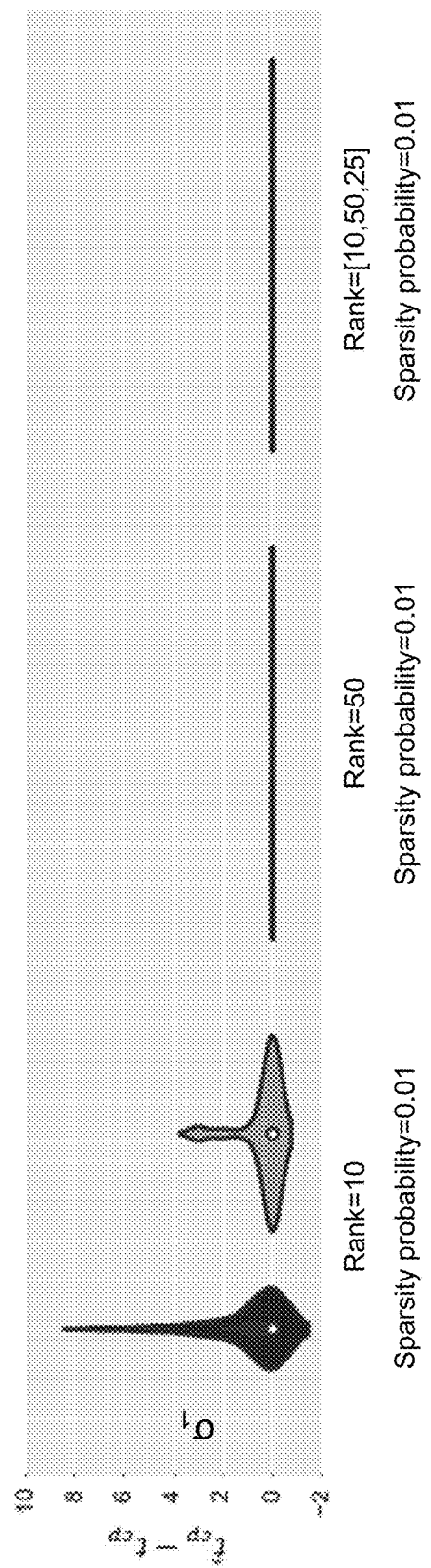
FIG. 17 provides a comparison as a function of rank between a relative difference between a detected change point time and a true change point time using the operations of FIGS. 3-5 with the sparsity probability of 0.01, and the two abrupt changes in the subspace in accordance with an illustrative embodiment.

Referring to FIG. 17, a comparison as a function of rank between a relative difference between a detected change point time and a true change point time using the third algorithm with the sparsity probability of 0.01, and the two abrupt changes in the subspace is shown in accordance with an illustrative embodiment. The results show that the third algorithm can accurately determine the change point time.

Video is a good candidate for low-rank subspace tracking due to a correlation between frames. In surveillance video, a background is generally stable and may change very slowly due to varying illumination. To demonstrate that the third algorithm can effectively track slowly changing subspace with change points, a "virtual camera" was panned from left to right and right to left through an airport video. The "virtual camera" moved at a speed of 1 pixel per 10 frames. The original frame was size 176×144 for the airport video data. The virtual camera had the same height and half the width. Each frame was stacked to a column and fed as dataset 124 to the third algorithm. To make the background subtraction task even more difficult, one change point was added to the video where the "virtual camera" jumped instantly from the most right-hand side to the most left-hand side.

Figure 18C:
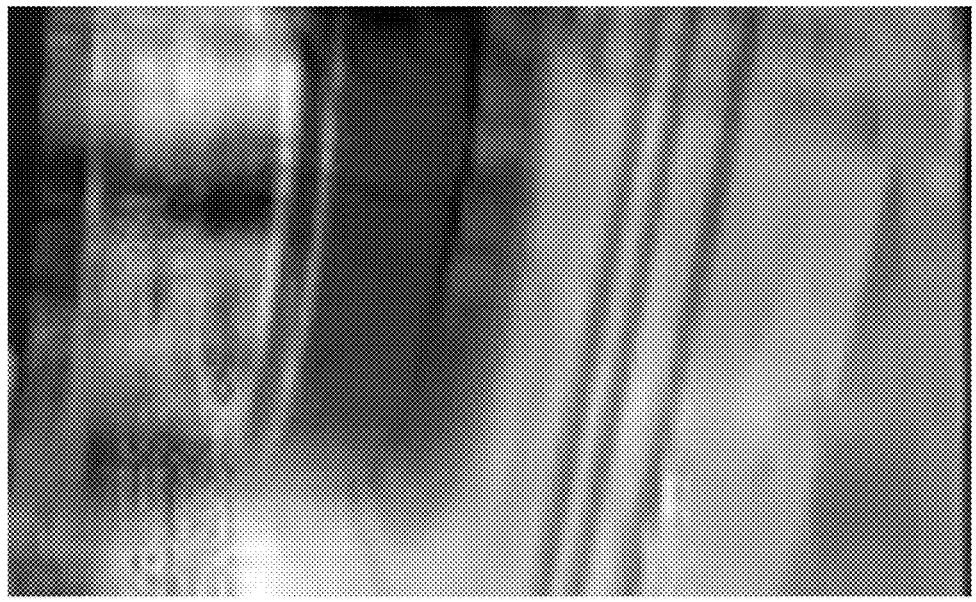
FIG. 18C shows the low-rank matrix computed from the image capture of FIG. 18A using the known RPCA algorithm in accordance with an illustrative embodiment.
Figure 18B:
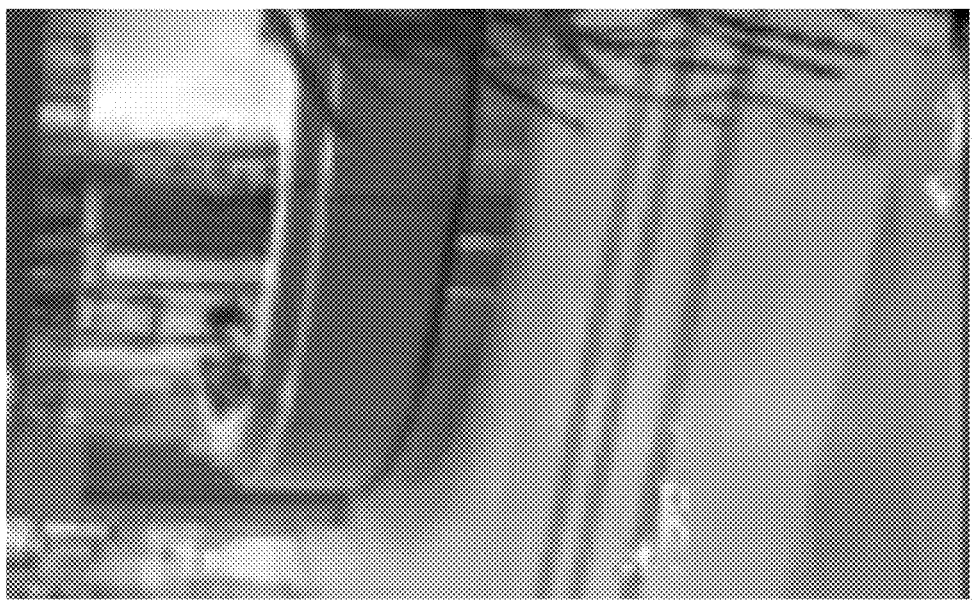
FIG. 18B shows the low-rank matrix computed from the image capture of FIG. 18A using the operations of FIGS. 3-5 in accordance with an illustrative embodiment.
Figure 18E:
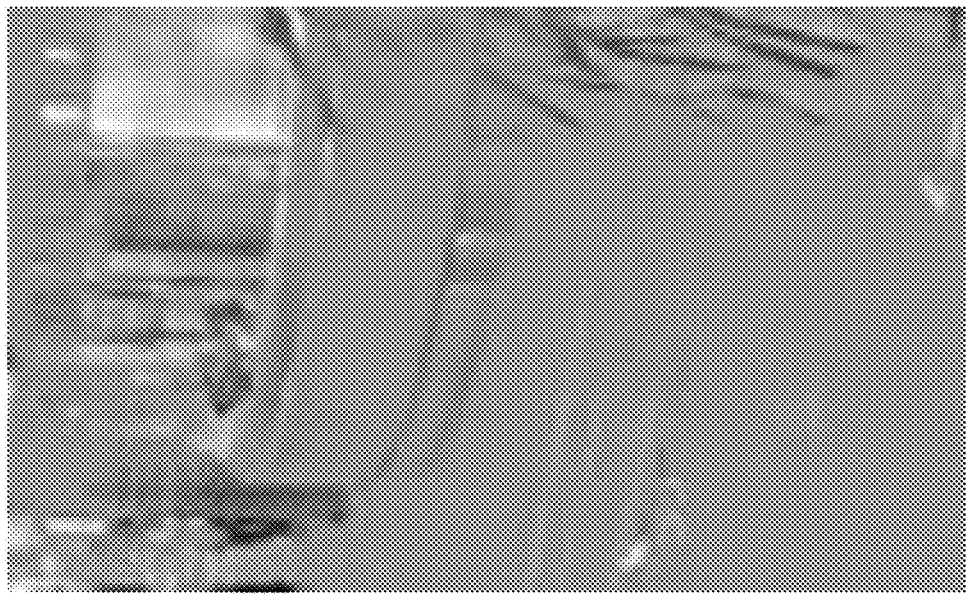
FIG. 18E shows the sparse noise matrix computed from the image capture of FIG. 18A using the known RPCA algorithm in accordance with an illustrative embodiment.
Figure 18D:
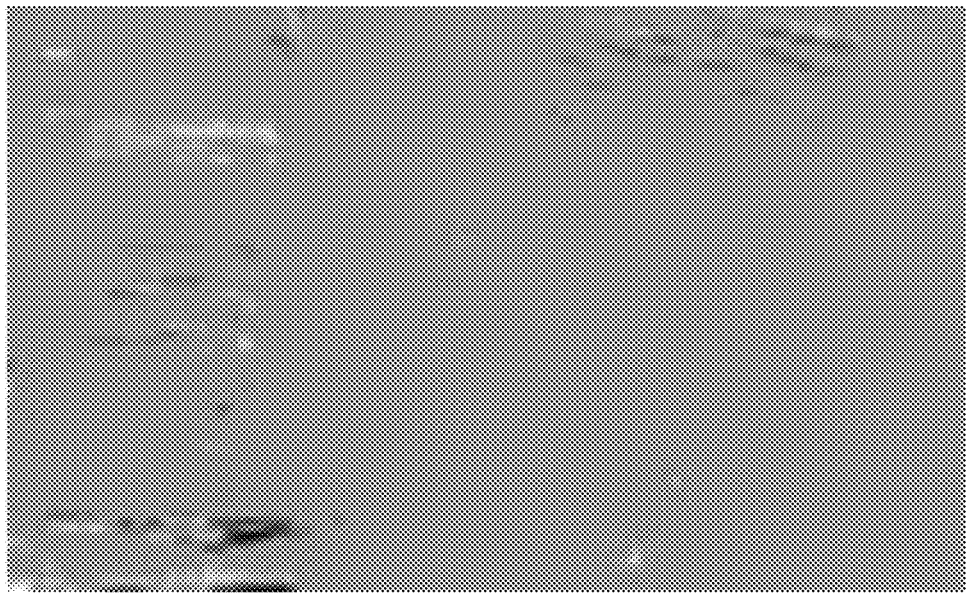
FIG. 18D shows the sparse noise matrix computed from the image capture of FIG. 18A using the operations of FIGS. 3-5 in accordance with an illustrative embodiment.

Referring to FIG. 18A, an image capture from an airport video at a first time is shown in accordance with an illustrative embodiment. Referring to FIG. 18B, the low-rank matrix computed from the image capture of FIG. 18A using the third algorithm is shown in accordance with an illustrative embodiment. Referring to FIG. 18C, the low-rank matrix computed from the image capture of FIG. 18A using the first algorithm is shown in accordance with an illustrative embodiment. Referring to FIG. 18D, the sparse noise matrix computed from the image capture of FIG. 18A using the third algorithm is shown in accordance with an illustrative embodiment. Referring to FIG. 18E, the sparse noise matrix computed from the image capture of FIG. 18A using the first algorithm is shown in accordance with an illustrative embodiment. The results generated using the third algorithm are less blurry with a less populated sparse noise matrix.

Figure 19A:
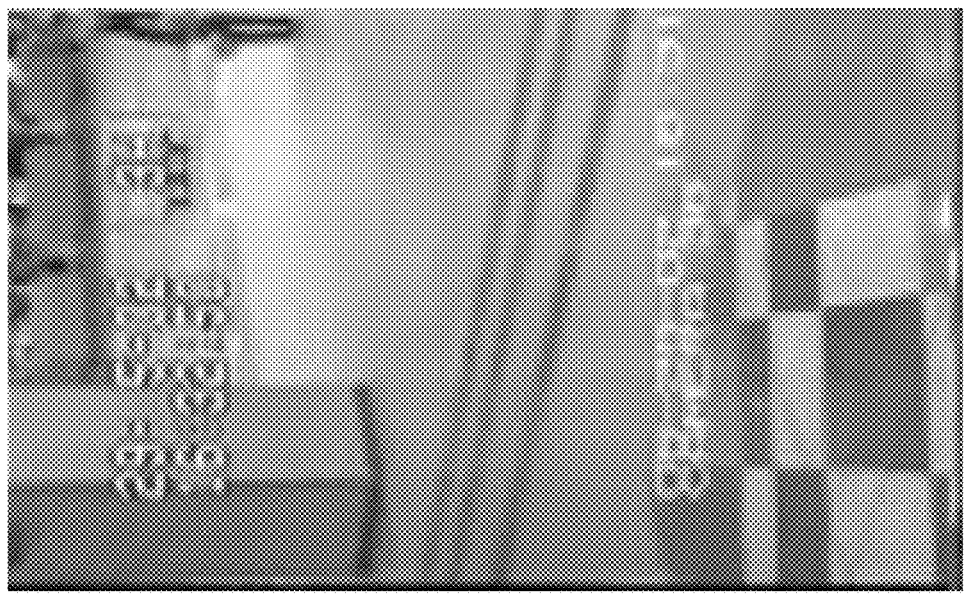
FIG. 19A shows an image capture from the airport video at a second time in accordance with an illustrative embodiment.
Figure 19C:
FIG. 19C shows the low-rank matrix computed from the image capture of FIG. 19A using the known RPCA algorithm in accordance with an illustrative embodiment.
Figure 19B:
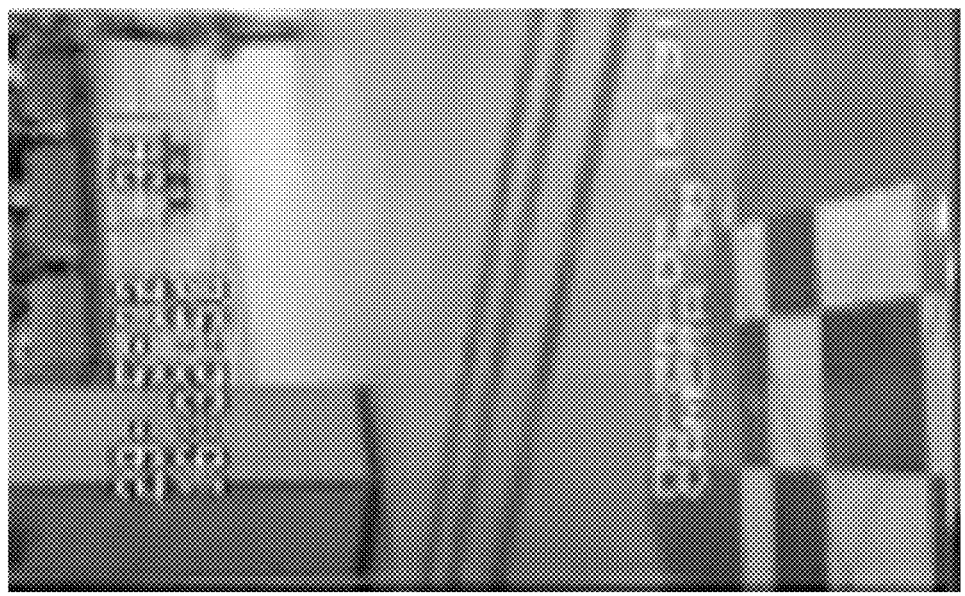
FIG. 19B shows the low-rank matrix computed from the image capture of FIG. 19A using the operations of FIGS. 3-5 in accordance with an illustrative embodiment.
Figure 19E:
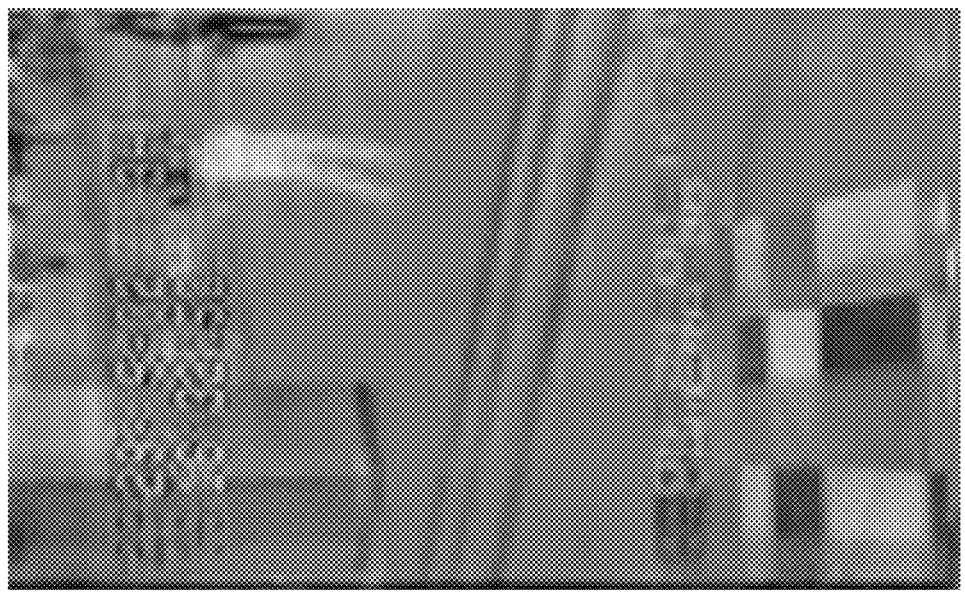
FIG. 19E shows the sparse noise matrix computed from the image capture of FIG. 19A using the known RPCA algorithm in accordance with an illustrative embodiment.
Figure 19D:
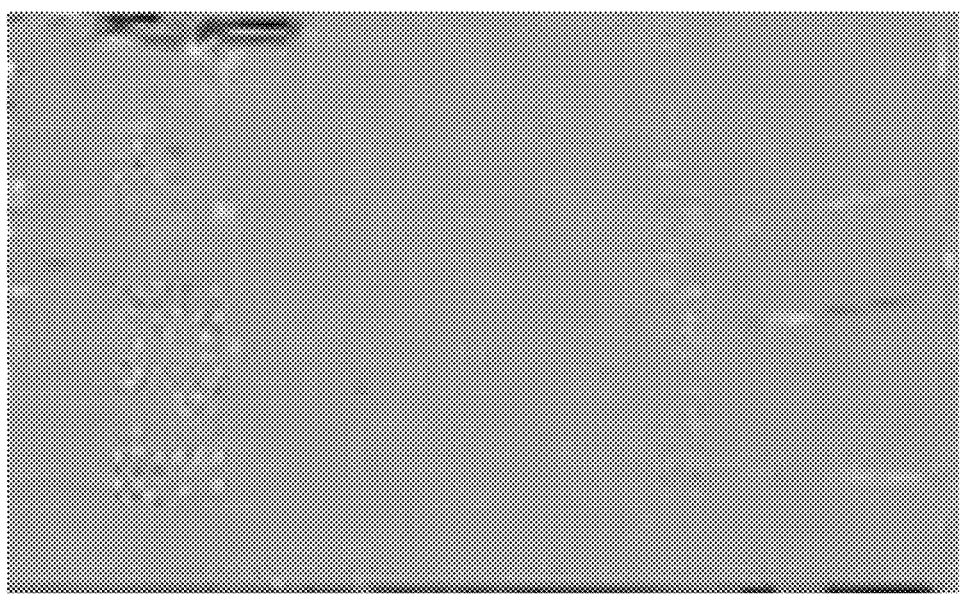
FIG. 19D shows the sparse noise matrix computed from the image capture of FIG. 19A using the operations of FIGS. 3-5 in accordance with an illustrative embodiment.

Referring to FIG. 19A, an image capture from the airport video at a second time is shown in accordance with an illustrative embodiment. Referring to FIG. 19B, the low-rank matrix computed from the image capture of FIG. 19A using the third algorithm is shown in accordance with an illustrative embodiment. Referring to FIG. 19C, the low-rank matrix computed from the image capture of FIG. 19A using the first algorithm is shown in accordance with an illustrative embodiment. Referring to FIG. 19D, the sparse noise matrix computed from the image capture of FIG. 19A using the third algorithm is shown in accordance with an illustrative embodiment. Referring to FIG. 19E, the sparse noise matrix computed from the image capture of FIG. 19A using the first algorithm is shown in accordance with an illustrative embodiment. The results generated using the third algorithm are less blurry with a less populated sparse noise matrix.

Referring to FIG. 20, a comparison of principal components computed using the third algorithm is shown in accordance with an illustrative embodiment that shows detection of a wind turbine that begins to deviate from the other turbines.

There are applications for decomposition application 122 in areas such as process control and equipment health monitoring, radar tracking, sonar tracking, face recognition, recommender system, cloud removal in satellite images, anomaly detection, background subtraction for surveillance video, system monitoring, failure detection in mechanical systems, intrusion detection in computer networks, human activity recognition based on sensor data, etc.

For tracking in video: in each image, the sparse noise matrix S represents the pixels of moving objects, while the low-rank subspace L represents a static background. Thus, standard tracking algorithms such as a Kalman filter may be applied to the sparse noise matrix S only while ignoring the low-rank subspace L.

For recommender systems: the low-rank subspace L may be used to represent preferences of users according to a rating they assign to movies, songs or other items. Such preferences can vary with time. Therefore, it is important to monitor change points. Additionally, the sparse noise matrix S may correspond to abnormal/undesirable users such as bots.

Dataset 124 may include sensor readings measuring multiple key health or process parameters at a very high frequency. A change point may indicate when a process being monitored deviates from a normal operating condition such as when a fault, a disturbance, a state change, etc. occurs. Decomposition application 122 is effective in an online environment in which high-frequency data is generated.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   (a) compute a principal components decomposition using an observation vector, wherein the principal components decomposition includes a sparse noise vector $s_t$ computed for the observation vector, wherein the observation vector includes a plurality of values, wherein each value of the plurality of values is associated with a variable to define a plurality of variables, wherein each variable of the plurality of variables describes a characteristic of a physical object, wherein the sparse noise vector $s_t$ has a dimension equal to m a number of the plurality of variables;
   (b) compute a zero counter time series value $\hat{c}_t$ using $\hat{c}_t = \sum_{i=1}^{m} s_t[i]$;
   (c) compute a probability value for $\hat{c}_t$ using $p = \sum_{i=\hat{c}_t+1}^{m+1} H_c[i] / \sum_{i=0}^{m+1} H_c[i]$, where, $H_c[i]$ includes a count of a number of times each value of $\hat{c}_t$ occurred for a plurality of previous observation vectors;
   (d) compare the computed probability value with a predefined abnormal observation probability value;
   (e) set an abnormal observation indicator and increment an abnormal vector counter when the computed probability value indicates the observation vector is abnormal;
   (f) initialize the abnormal vector counter when the computed probability value indicates the observation vector is not abnormal;
   repeat (a) to (f) for each observation vector of a plurality of subsequent observation vectors as the observation vector until the abnormal vector counter is greater than or equal to a predefined number of abnormal vectors;
   identify a first observation vector of the observation vectors of the plurality of subsequent observation vectors indicated as abnormal in (e); and
   output the identified first observation vector as a change point that indicates a subspace of the computed principal components decomposition has changed.

2. The non-transitory computer-readable medium of claim 1, wherein the described characteristic of the physical object is a pixel of an image of the physical object.

3. The non-transitory computer-readable medium of claim 1, wherein the described characteristic of the physical object is a sensor measurement from a sensor connected to detect the characteristic of the physical object.

4. The non-transitory computer-readable medium of claim 3, wherein the sensor is selected from the group consisting of a camera, a video camera, a radar system, and a sonar system.

5. The non-transitory computer-readable medium of claim 1, wherein the change point indicates the physical object deviated from a normal operating condition.

6. The non-transitory computer-readable medium of claim 5, wherein the physical object is a machine.

7. The non-transitory computer-readable medium of claim 5, wherein the normal operating condition is a static image.

8. The non-transitory computer-readable medium of claim 1, wherein the observation vector includes a sensor measurement from each of a plurality of sensors.

9. The non-transitory computer-readable medium of claim 8, wherein each of the plurality of subsequent observation vectors includes the sensor measurement from each of the plurality of sensors captured later in time relative to the observation vector.

10. The non-transitory computer-readable medium of claim 8, wherein the sensor measurement is a pixel of a camera image.

11. The non-transitory computer-readable medium of claim 1, wherein, after identifying the first observation vector, the computer-readable instructions further cause the computing device to reinitialize $\sum_{i=0}^{m+1} H_c[i] = 0$.

12. The non-transitory computer-readable medium of claim 11, wherein, before (a), the computer-readable instructions further cause the computing device to:
   define an initial observation matrix with a first plurality of observation vectors, wherein a number of the first plurality of observation vectors is a predefined window length;
   compute a principal components decomposition using the defined initial observation matrix, wherein the principal components decomposition includes a sparse noise vector s, a first singular value decomposition vector U, and a second singular value decomposition vector v for each observation vector of the first plurality of observation vectors; and
   compute a next principal components decomposition for a next observation vector using the computed principal components decomposition, wherein computing the next principal components decomposition is repeated for each of a second plurality of observation vectors as the next observation vector.

13. The non-transitory computer-readable medium of claim 12, wherein the second plurality of observation vectors are the plurality of previous observation vectors.

14. The non-transitory computer-readable medium of claim 13, wherein the zero counter time series value $\hat{c}_t$ is computed for each of the second plurality of observation vectors, and $H_c[\hat{c}_t+1]$ is incremented for each of the second plurality of observation vectors.

15. The non-transitory computer-readable medium of claim 12, wherein, after identifying the first observation vector, the computer-readable instructions further cause the computing device to:
define a second initial observation matrix with a third plurality of observation vectors, wherein a number of the third plurality of observation vectors is the predefined window length;
compute a second principal components decomposition using the defined second initial observation matrix, wherein the second principal components decomposition includes the sparse noise vector s, the first singular value decomposition vector U, and the second singular value decomposition vector v for each observation vector of the third plurality of observation vectors; and
compute a second next principal components decomposition for a second next observation vector using the computed second principal components decomposition, wherein computing the second next principal components decomposition is repeated for each of a fourth plurality of observation vectors as the second next observation vector.

16. The non-transitory computer-readable medium of claim 15, wherein (a) to (f) is repeated for each observation vector of a fifth plurality of observation vectors as the observation vector, wherein the fifth plurality of observation vectors is subsequent to the fourth plurality of observation vectors in time.

17. The non-transitory computer-readable medium of claim 1, wherein, before (a), the computer-readable instructions further cause the computing device to:
define an initial observation matrix with a first plurality of observation vectors, wherein a number of the first plurality of observation vectors is a predefined window length;
compute a principal components decomposition using the defined initial observation matrix, wherein the principal components decomposition includes a sparse noise vector s, a first singular value decomposition vector U, and a second singular value decomposition vector v for each observation vector of the first plurality of observation vectors; and
compute a next principal components decomposition for a next observation vector using the computed principal components decomposition, wherein computing the next principal components decomposition is repeated for each of a second plurality of observation vectors as the next observation vector.

18. The non-transitory computer-readable medium of claim 17, wherein the second plurality of observation vectors are the plurality of previous observation vectors.

19. The non-transitory computer-readable medium of claim 18, wherein the zero counter time series value $\hat{c}_t$ is computed for each of the second plurality of observation vectors, and $H_c[\hat{c}_t+1]$ is incremented for each of the second plurality of observation vectors.

20. A computing device comprising:
a processor; and
a non-transitory computer-readable medium operably coupled to the processor, the computer-readable medium having computer-readable instructions stored thereon that, when executed by the processor, cause the computing device to
(a) compute a principal components decomposition using an observation vector, wherein the principal components decomposition includes a sparse noise vector $s_t$ computed for the observation vector, wherein the observation vector includes a plurality of values, wherein each value of the plurality of values is associated with a variable to define a plurality of variables, wherein each variable of the plurality of variables describes a characteristic of a physical object, wherein the sparse noise vector $s_t$ has a dimension equal to m a number of the plurality of variables;
(b) compute a zero counter time series value $\hat{c}_t$ using $\hat{c}_t = \Sigma_{i=1}^{m} s_t[i]$;
(c) compute a probability value for $\hat{c}_t$ using $p = \Sigma_{i=\hat{c}_t+1}^{m+1} H_c[i] / \Sigma_{i=0}^{m+1} H_c[i]$, where $H_c[i]$ includes a count of a number of times each value of $\hat{c}_t$ occurred for a plurality of previous observation vectors;
(d) compare the computed probability value with a predefined abnormal observation probability value;
(e) set an abnormal observation indicator and increment an abnormal vector counter when the computed probability value indicates the observation vector is abnormal;
(f) initialize the abnormal vector counter when the computed probability value indicates the observation vector is not abnormal;
repeat (a) to (f) for each observation vector of a plurality of subsequent observation vectors as the observation vector until the abnormal vector counter is greater than or equal to a predefined number of abnormal vectors;
identify a first observation vector of the observation vectors of the plurality of subsequent observation vectors indicated as abnormal in (e); and
output the identified first observation vector as a change point that indicates a subspace of the computed principal components decomposition has changed.

21. The computing device of claim 20, wherein the change point indicates the physical object deviated from a normal operating condition.

22. A method of detecting an abnormal observation vector using a principal components decomposition, the method comprising:
(a) computing, by a computing device, a principal components decomposition using an observation vector, wherein the principal components decomposition includes a sparse noise vector $s_t$ computed for the observation vector, wherein the observation vector includes a plurality of values, wherein each value of the plurality of values is associated with a variable to define a plurality of variables, wherein each variable of the plurality of variables describes a characteristic of a physical object, wherein the sparse noise vector $s_t$ has a dimension equal to m a number of the plurality of variables;
(b) computing, by the computing device, a zero counter time series value $\hat{c}_t$ using $\hat{c}_t = \Sigma_{i=1}^{m} s_t[i]$;
(c) computing, by the computing device, a probability value for $\hat{c}_t$ using $p = \Sigma_{i=\hat{c}_t+1}^{m+1} H_c[i] / \Sigma_{i=0}^{m+1} H_c[i]$, where $H_c[i]$ includes a count of a number of times each value of $\hat{c}_t$ occurred for a plurality of previous observation vectors;
(d) comparing, by the computing device, the computed probability value with a predefined abnormal observation probability value;
(e) setting, by the computing device, an abnormal observation indicator and incrementing, by the computing device, an abnormal vector counter when the computed probability value indicates the observation vector is abnormal;

(f) initializing, by the computing device, the abnormal vector counter when the computed probability value indicates the observation vector is not abnormal;

repeating, by the computing device, (a) to (f) for each observation vector of a plurality of subsequent observation vectors as the observation vector until the abnormal vector counter is greater than or equal to a predefined number of abnormal vectors;

identifying, by the computing device, a first observation vector of the observation vectors of the plurality of subsequent observation vectors indicated as abnormal in (e); and outputting, by the computing device, the identified first observation vector as a change point that indicates a subspace of the computed principal components decomposition has changed.

23. The method of claim 22, wherein the described characteristic of the physical object is a pixel of an image of the physical object.

24. The method of claim 22, wherein the described characteristic of the physical object is a sensor measurement from a sensor connected to detect the characteristic of the physical object.

25. The method of claim 22, wherein the change point indicates the physical object deviated from a normal operating condition.

26. The method of claim 25, further comprising, after identifying the first observation vector, reinitializing, by the computing device, $\Sigma_{i=0}^{m+1} H_c[i]=0$.

27. The method of claim 26, further comprising, before (a):

defining, by the computing device, an initial observation matrix with a first plurality of observation vectors, wherein a number of the first plurality of observation vectors is a predefined window length;

computing, by the computing device, a principal components decomposition using the defined initial observation matrix, wherein the principal components decomposition includes a sparse noise vector s, a first singular value decomposition vector U, and a second singular value decomposition vector v for each observation vector of the first plurality of observation vectors; and computing, by the computing device, a next principal components decomposition for a next observation vector using the computed principal components decomposition, wherein computing the next principal components decomposition is repeated for each of a second plurality of observation vectors as the next observation vector.

28. The method of claim 27, wherein the second plurality of observation vectors are the plurality of previous observation vectors.

29. The method of claim 28, wherein the zero counter time series value $\hat{c}_t$ is computed for each of the second plurality of observation vectors, and $H_c[\hat{c}_t+1]$ is incremented for each of the second plurality of observation vectors.

30. The method of claim 27, further comprising, after identifying the first observation vector:

defining, by the computing device, a second initial observation matrix with a third plurality of observation vectors, wherein a number of the third plurality of observation vectors is the predefined window length;

computing, by the computing device, a second principal components decomposition using the defined second initial observation matrix, wherein the second principal components decomposition includes the sparse noise vector s, the first singular value decomposition vector U, and the second singular value decomposition vector v for each observation vector of the third plurality of observation vectors; and computing, by the computing device, a second next principal components decomposition for a second next observation vector using the computed second principal components decomposition, wherein computing the second next principal components decomposition is repeated for each of a fourth plurality of observation vectors as the second next observation vector.

* * * * *

UNITED STATES PATENT AND TRADEMARK OFFICE
CERTIFICATE OF CORRECTION

PATENT NO. : 10,157,319 B2  
APPLICATION NO. : 15/894002  
DATED : December 18, 2018  
INVENTOR(S) : Wei Xiao et al.

Page 1 of 3

It is certified that error appears in the above-identified patent and that said Letters Patent is hereby corrected as shown below:

In the Specification

Column 1, Line 62:
Delete the phrase "$\hat{c}_t = \sum_{i=1}{}^m s_t[i].$" and replace with --$\hat{c}_t = \sum_{i=1}^m s_t[i].$--.

Column 1, Line 63:
Delete the phrase "$p = \sum_{i=\hat{c}_t+1}{}^{m+1} H_c[i]/\sum_{i=0}{}^{m+1} H_c[i],$" and replace with --$p = \sum_{i=\hat{c}_t+1}^{m+1} H_c[i]/\sum_{i=0}^{m+1} H_c[i],$--.

Column 8, Line 49:
Delete the phrase "$c_t = \sum_{i=1}{}^m I_{s_t[i] \neq 0}.$" and replace with --$c_t = \sum_{i=1}^m I_{s_t[i] \neq 0}.$--.

Column 9, Line 28:
Delete the phrase "to determine $U, \Sigma,$ and $V.$" and replace with --to determine $U, \Sigma,$ and $V^*$.--.

Column 10, Line 33:
Delete the phrase "Assuming that $\{v_i, s_i\}_{i=1}$" and replace with --Assuming that $\{v_i, s_i\}_{i=1}^t$--.

Column 13, Line 24:
Delete the phrase "is initialized as $\mathcal{D}_\tau(X) = US_\tau(E)V^*$" and replace with --is initialized as $\mathcal{D}_\tau(X) = US_\tau(\Sigma)V^*$--.

Column 13, Line 50:
Delete the phrase "From SVD, $L^k = \hat{U}\hat{E}\hat{V},$" and replace with --From SVD, $L^k = \hat{U}\hat{\Sigma}\hat{V},$--.

Signed and Sealed this  
Twelfth Day of March, 2019

Andrei Iancu  
*Director of the United States Patent and Trademark Office*

CERTIFICATE OF CORRECTION (continued)
U.S. Pat. No. 10,157,319 B2

Column 13, Line 51-52:
Delete the phrase "$A_0 = \sum_{i=-(n_{start}-1)}^{0} v_i v_i^T \in \mathbb{R}^{r \times r}$," and replace with
-- $A_0 = \sum_{i=-(n_{start}-1)}^{0} v_i v_i^T \in \mathbb{R}^{r \times r}$, --.

Column 13, Line 52:
Delete the phrase "$B_0 = \sum_{i=-(n_{start}-1)}^{0} (m_i - s_i) v_i^T \in \mathbb{R}^{m \times r}$." and replace with
-- $B_0 = \sum_{i=-(n_{start}-1)}^{0} (m_i - s_i) v_i^T \in \mathbb{R}^{m \times r}$. --.

Column 13, Line 54:
Delete the phrase "of $\hat{U}$, $\hat{E}$, or $\hat{V}$." and replace with --of $\hat{U}$, $\hat{\Sigma}$, or $\hat{V}$.--.

Column 14, Line 15-16:
Delete the phrase "$A_t = A_{t-1} + v_t v_t^T - v_{t-n_{win}} v_{t-n_{win}}^T$, where the value $v_{t-n_{win}} v_{t-n_{win}}^T$,"
and replace with -- $A_t = A_{t-1} + v_t v_t^T - v_{t-n_{win}} v_{t-n_{win}}^T$, where the value $v_{t-n_{win}} v_{t-n_{win}}^T$ --.

Column 14, Line 18-19:
Delete the phrase "$B_t = B_{t-1} + (m_t - s_t) v_t^T - (m_{t-n_{win}} - s_{t-n_{win}}) v_{t-n_{win}}^T$, where the value $(m_{t-n_{win}} - s_{t-n_{win}}) v_{t-n_{win}}^T$," and replace with
-- $B_t = B_{t-1} + (m_t - s_t) v_t^T - (m_{t-n_{win}} - s_{t-n_{win}}) v_{t-n_{win}}^T$, where the value $(m_{t-n_{win}} - s_{t-n_{win}}) v_{t-n_{win}}^T$ --.

Column 14, Line 59:
Delete the phrase "where $L_T = \{l_1, l_2, l_T\}$," and replace with --where $L_T = \{l_1, l_2, ... l_T\}$,--.

Column 18, Line 2:
Delete the phrase "where $L_T = \{l_1, l_2, ... , l_T\}$," and replace with --where $L_T = \{l_1, l_2, ... l_T\}$,--.

Column 18, Line 22:
Delete the phrase "$\hat{c}_t = \sum_{i=1}^{m} s_t[i]$." and replace with -- $\hat{c}_t = \sum_{i=1}^{m} s_t[i]$. --.

Column 18, Line 51:
Delete the phrase "$p = \sum_{i=\hat{c}_t+1}^{m+1} H_c[i] / \sum_{i=0}^{m+1} H_c[i]$." and replace with
-- $p = \sum_{i=\hat{c}_t-n_{tol}+1}^{m+1} H_c[i] / \sum_{i=0}^{m+1} H_c[i]$. --.

Column 19, Line 26-27:
Delete the phrase "$n_{abnormal} = \sum_{i=1}^{N_{check}} B_f[i]$." and replace with -- $n_{abnormal} = \sum_{i=1}^{N_{check}} B_f[i]$. --.

CERTIFICATE OF CORRECTION (continued)
U.S. Pat. No. 10,157,319 B2

Column 20, Line 11:
Delete the phrase "$l_{t_{ov}}, s_{t_{ov}}, v_{t_{ov}}, U_{t_{ov}}), A_{t_{ov}}, B_{t_{ov}})$, etc." and replace with --$l_{t_{ov}}, s_{t_{ov}}, v_{t_{ov}}, U_{t_{ov}}, A_{t_{ov}}, B_{t_{ov}}$, etc.--.

Column 20, Line 19:
Delete the phrase "the H, vector" and replace with --the $H_c$ vector--.

Column 20, Line 59:
Delete the phrase "$\{\tilde{U}_k\}_{k=1}{}^K$" and replace with --$\{\tilde{U}_k\}_{k=1}^K$--.

In the Claims

Claim 1 (b), Column 25, Line 50:
Delete the phrase "$\hat{c}_t = \Sigma_{i=1}{}^m s_t[i]$;" and replace with --$\hat{c}_t = \sum_{i=1}^m s_t[i]$;--.

Claim 1 (c), Column 25, Lines 51-52:
Delete the phrase "$p = \Sigma_{i=\hat{c}_t+1}{}^{m+1} H_c[i] / \Sigma_{i=0}{}^{m+1} H_c[i]$," and replace with --$p = \sum_{i=\hat{c}_t+1}^{m+1} H_c[i] / \sum_{i=0}^{m+1} H_c[i]$.--.

Claim 11, Column 26, Line 39:
Delete the phrase "$\Sigma_{i=0}{}^{m+1} H_c[i] = 0$." and replace with --$\sum_{i=0}^{m+1} H_c[i] = 0$.--.

Claim 20 (b), Column 28, Line 10:
Delete the phrase "$\hat{c}_t = \Sigma_{i=1}{}^m s_t[i]$;" and replace with --$\hat{c}_t = \sum_{i=1}^m s_t[i]$;--.

Claim 20 (c), Column 28, Lines 11-12:
Delete the phrase "$p = \Sigma_{i=\hat{c}_t+1}{}^{m+1} H_c[i] / \Sigma_{i=0}{}^{m+1} H_c[i]$" and replace with --$p = \sum_{i=\hat{c}_t+1}^{m+1} H_c[i] / \sum_{i=0}^{m+1} H_c[i]$--.

Claim 22 (b), Column 28, Line 54:
Delete the phrase "$\hat{c}_t = \Sigma_{i=1}{}^m s_t[i]$;" and replace with --$\hat{c}_t = \sum_{i=1}^m s_t[i]$;--.

Claim 22 (c), Column 28, Line 56:
Delete the phrase "$p = \Sigma_{i=\hat{c}_t+1}{}^{m+1} H_c[i] / \Sigma_{i=0}{}^{m+1} H_c[i]$," and replace with --$p = \sum_{i=\hat{c}_t+1}^{m+1} H_c[i] / \sum_{i=0}^{m+1} H_c[i]$.--.

Claim 26, Column 29, Line 29:
Delete the phrase "$\Sigma_{i=0}{}^{m+1} H_c[i] = 0$." and replace with --$\sum_{i=0}^{m+1} H_c[i] = 0$.--.